US009646376B2

(12) United States Patent
Kaufman et al.

(10) Patent No.: US 9,646,376 B2
(45) Date of Patent: May 9, 2017

(54) SYSTEM AND METHOD FOR REVIEWING AND ANALYZING CYTOLOGICAL SPECIMENS

(71) Applicant: HOLOGIC, INC., Marlborough, MA (US)

(72) Inventors: Howard B. Kaufman, Newton, MA (US); Eileen Ludlow, Groton, MA (US)

(73) Assignee: HOLOGIC, INC., Marlborough, MA (US)

( * ) Notice: Subject to any disclaimer, the term of this patent is extended or adjusted under 35 U.S.C. 154(b) by 67 days.

(21) Appl. No.: 14/202,665

(22) Filed: Mar. 10, 2014

(65) Prior Publication Data

US 2014/0314300 A1 Oct. 23, 2014

Related U.S. Application Data

(60) Provisional application No. 61/787,975, filed on Mar. 15, 2013.

(51) Int. Cl.
*G06K 9/00* (2006.01)
*G06T 7/00* (2017.01)

(52) U.S. Cl.
CPC ........ *G06T 7/0012* (2013.01); *G06K 9/00127* (2013.01); *G06K 9/00147* (2013.01); *G06T 2207/30004* (2013.01)

(58) Field of Classification Search
CPC ........... G06K 9/00127; G06K 9/00147; G01N 2015/1006; G06T 2207/30004; G06T 7/0012
See application file for complete search history.

(56) References Cited

U.S. PATENT DOCUMENTS 3,115,140 A 12/1963 Volkman
4,503,844 A 3/1985 Siczek
(Continued)

FOREIGN PATENT DOCUMENTS

CN 1640139 A 7/2005
CN 101601266 A 12/2009
(Continued)

OTHER PUBLICATIONS

John Eichhorn et al: "Internet-Based Gynecologic Telecytology With Remote Automated Image Selection: Results of a First-Phase Developmental Trial", American Journal of Clinical Pathology, Jan. 1, 2008 (Jan. 1, 2008).*

(Continued)

*Primary Examiner* — Andrew W Johns
*Assistant Examiner* — Ian Lemieux
(74) *Attorney, Agent, or Firm* — Lando & Anastasi, LLP

(57) ABSTRACT

Systems and methods of use to facilitate classification of cytological specimens are discussed. The system acquires or imports image data of a cytological specimen. The imported image data may include, or the system may otherwise perform an image analysis to identify one or more objects of interest in a respective specimen image dataset, including feature attributes for the identified objects. The system analyzes the feature attributes by predetermined criteria and/or optionally with user inputted criteria. The system includes an analysis tool that assists the user in identifying cytologically abnormal objects, if present in a particular specimen, by manipulating and viewing images of objects selected as a function of feature attributes. More generally, the analysis tool aides the user to find, extract, and display abnormal objects from within a large dataset of images and facilitates navigation through large amounts of image data (Continued)

and enables the efficient classification of the entire specimen.

20 Claims, 8 Drawing Sheets

(56) References Cited

U.S. PATENT DOCUMENTS

| | | |
|---|---|---|
| 4,552,346 A | 11/1985 | Schnelle et al. |
| 4,572,203 A | 2/1986 | Feinstein |
| 4,733,661 A | 3/1988 | Palestrant |
| 4,825,162 A | 4/1989 | Roemer et al. |
| 4,930,516 A | 6/1990 | Alfano et al. |
| 4,930,525 A | 6/1990 | Palestrant |
| 4,943,986 A | 7/1990 | Barbarisi |
| 4,989,608 A | 2/1991 | Ratner |
| 5,014,968 A | 5/1991 | Lammers et al. |
| 5,047,036 A | 9/1991 | Koutrouvelis |
| 5,072,721 A | 12/1991 | Weiler et al. |
| 5,096,216 A | 3/1992 | McCalla |
| 5,154,179 A | 10/1992 | Ratner |
| 5,196,019 A | 3/1993 | Davis et al. |
| 5,297,551 A | 3/1994 | Margosian et al. |
| 5,308,352 A | 5/1994 | Koutrouvelis |
| 5,426,685 A | 6/1995 | Pellegrino et al. |
| 5,548,218 A | 8/1996 | Lu |
| 5,569,266 A | 10/1996 | Siczek |
| 5,575,798 A | 11/1996 | Koutrouvelis |
| 5,590,653 A | 1/1997 | Aida et al. |
| 5,590,655 A | 1/1997 | Hussman |
| 5,594,337 A | 1/1997 | Boskamp |
| 5,677,966 A | 10/1997 | Doerrer et al. |
| 5,678,549 A | 10/1997 | Heywang-Koebrunner et al. |
| 5,682,098 A | 10/1997 | Vij |
| 5,682,890 A | 11/1997 | Kormos et al. |
| 5,706,812 A | 1/1998 | Strenk et al. |
| 5,744,958 A | 4/1998 | Werne |
| 5,782,764 A | 7/1998 | Werne |
| 5,806,521 A | 9/1998 | Morimoto et al. |
| 5,817,023 A | 10/1998 | Daft |
| 5,855,554 A | 1/1999 | Schneider et al. |
| 5,868,673 A | 2/1999 | Vesely |
| 5,868,757 A | 2/1999 | Koutrouvelis |
| 5,944,023 A | 8/1999 | Johnson et al. |
| 6,066,102 A | 5/2000 | Townsend et al. |
| 6,091,985 A | 7/2000 | Alfano et al. |
| 6,159,221 A | 12/2000 | Chakeres |
| 6,163,616 A | 12/2000 | Feldman |
| 6,163,717 A | 12/2000 | Su |
| 6,174,291 B1 | 1/2001 | McMahon et al. |
| 6,201,392 B1 | 3/2001 | Anderson et al. |
| 6,229,145 B1 | 5/2001 | Weinberg |
| 6,281,681 B1 | 8/2001 | Cline et al. |
| 6,295,671 B1 | 10/2001 | Reesby et al. |
| 6,298,506 B1 | 10/2001 | Heinold et al. |
| 6,302,579 B1 | 10/2001 | Meyer et al. |
| 6,324,243 B1 | 11/2001 | Edic et al. |
| 6,334,067 B1 | 12/2001 | Brabrand |
| 6,421,454 B1 | 7/2002 | Burke et al. |
| 6,421,553 B1 | 7/2002 | Costa et al. |
| 6,437,567 B1 | 8/2002 | Schenck et al. |
| 6,446,286 B1 | 9/2002 | Karmalawy |
| 6,459,923 B1 | 10/2002 | Plewes et al. |
| 6,498,489 B1 | 12/2002 | Vij |
| 6,521,209 B1 | 2/2003 | Meade et al. |
| 6,526,299 B2 | 2/2003 | Pickard |
| 6,546,123 B1* | 4/2003 | McLaren .......... G01N 1/312 382/128 |
| 6,591,128 B1 | 7/2003 | Wu et al. |
| 6,593,101 B2 | 7/2003 | Richards-Kortum et al. |
| 6,628,983 B1 | 9/2003 | Gagnon |
| 6,639,406 B1 | 10/2003 | Boskamp et al. |
| 6,640,364 B1 | 11/2003 | Josephson et al. |
| 6,675,037 B1 | 1/2004 | Tsekos |
| 6,697,652 B2 | 2/2004 | Georgakoudi et al. |
| 6,723,303 B1 | 4/2004 | Quay |
| 6,806,711 B2 | 10/2004 | Reykowski |
| 6,810,595 B2 | 11/2004 | Chan |
| 6,822,450 B2 | 11/2004 | Klinge et al. |
| 6,867,593 B2 | 3/2005 | Menon et al. |
| 6,904,305 B2 | 6/2005 | Tsekos |
| 6,922,859 B2 | 8/2005 | Gagnon et al. |
| 6,927,406 B2 | 8/2005 | Zyromski |
| 6,950,492 B2 | 9/2005 | Besson |
| 7,011,447 B2 | 3/2006 | Moyers |
| 7,020,314 B1 | 3/2006 | Suri et al. |
| 1,024,711 A1 | 4/2006 | Stasney et al. |
| 7,023,209 B2 | 4/2006 | Zhang et al. |
| 7,024,027 B1 | 4/2006 | Suri et al. |
| D533,278 S | 12/2006 | Luginbuhl et al. |
| 7,155,043 B2 | 12/2006 | Daw |
| 7,166,113 B2 | 1/2007 | Arambula et al. |
| 7,176,683 B2 | 2/2007 | Reeder et al. |
| 7,245,125 B2 | 7/2007 | Harer et al. |
| 7,245,694 B2 | 7/2007 | Jing et al. |
| D569,977 S | 5/2008 | Luginbuhl et al. |
| 7,373,676 B2 | 5/2008 | Markovic et al. |
| 7,379,769 B2 | 5/2008 | Piron et al. |
| 7,545,966 B2 | 6/2009 | Lewin et al. |
| 7,583,786 B2 | 9/2009 | Jing et al. |
| 7,590,492 B2* | 9/2009 | Zahniser .......... G01N 15/1475 702/19 |
| 7,656,993 B2 | 2/2010 | Hoernig |
| 7,711,407 B2 | 5/2010 | Hughes et al. |
| 7,809,426 B2 | 10/2010 | Kim et al. |
| 7,881,428 B2 | 2/2011 | Jing et al. |
| 7,908,690 B2 | 3/2011 | Luginbuhl et al. |
| 7,925,328 B2 | 4/2011 | Urquhart et al. |
| 7,937,132 B2 | 5/2011 | Piron et al. |
| 7,970,452 B2 | 6/2011 | Piron et al. |
| 8,041,091 B2* | 10/2011 | de Oliveira e Ramos ............ A61B 3/0041 345/418 |
| 8,050,736 B2 | 11/2011 | Piron et al. |
| 8,155,417 B2 | 4/2012 | Piron et al. |
| 8,162,847 B2 | 4/2012 | Wale et al. |
| 8,162,848 B2 | 4/2012 | Hibner et al. |
| 8,162,849 B2 | 4/2012 | Deshmukh et al. |
| 8,241,301 B2 | 8/2012 | Zhang et al. |
| 8,290,569 B2 | 10/2012 | Piron et al. |
| 8,292,824 B2 | 10/2012 | Okada |
| 8,298,245 B2 | 10/2012 | Li et al. |
| 8,333,685 B2 | 12/2012 | Maier |
| 8,509,513 B2 | 8/2013 | Piron et al. |
| 2001/0011394 A1 | 8/2001 | Heimbrock et al. |
| 2001/0039378 A1 | 11/2001 | Lampman et al. |
| 2002/0035864 A1 | 3/2002 | Paltieli et al. |
| 2002/0056161 A1 | 5/2002 | Falbo et al. |
| 2002/0065461 A1 | 5/2002 | Cosman |
| 2002/0073717 A1 | 6/2002 | Dean et al. |
| 2002/0095730 A1 | 7/2002 | Al-Kassim et al. |
| 2002/0099264 A1 | 7/2002 | Fontenot |
| 2002/0106119 A1* | 8/2002 | Foran ............... G06F 19/321 382/133 |
| 2002/0131551 A1 | 9/2002 | Johnson et al. |
| 2002/0156365 A1 | 10/2002 | Tsekos |
| 2002/0164810 A1 | 11/2002 | Dukor et al. |
| 2002/0180442 A1 | 12/2002 | Vij |
| 2002/0193815 A1 | 12/2002 | Foerster et al. |
| 2003/0007598 A1 | 1/2003 | Wang et al. |
| 2003/0191397 A1 | 10/2003 | Webb |
| 2003/0194048 A1 | 10/2003 | De Man et al. |
| 2003/0194050 A1 | 10/2003 | Eberhard et al. |
| 2003/0199753 A1 | 10/2003 | Hibner et al. |
| 2003/0199754 A1 | 10/2003 | Hibner et al. |
| 2003/0206019 A1 | 11/2003 | Boskamp |
| 2003/0236461 A1 | 12/2003 | Poland |
| 2004/0004614 A1 | 1/2004 | Bacus et al. |
| 2004/0077972 A1 | 4/2004 | Tsonton et al. |
| 2004/0081273 A1 | 4/2004 | Ning |
| 2004/0183534 A1 | 9/2004 | Chan et al. |
| 2004/0216233 A1 | 11/2004 | Ludwig et al. |
| 2004/0220467 A1 | 11/2004 | Bonutti |
| 2005/0005356 A1 | 1/2005 | Zacharopoulos et al. |

(56) References Cited

U.S. PATENT DOCUMENTS

| | | |
|---|---|---|
| 2005/0033315 A1 | 2/2005 | Hankins |
| 2005/0059877 A1 | 3/2005 | Falbo |
| 2005/0080333 A1 | 4/2005 | Piron et al. |
| 2005/0096539 A1 | 5/2005 | Leibig et al. |
| 2005/0104591 A1 | 5/2005 | Qu et al. |
| 2005/0228267 A1 | 10/2005 | Bulkes et al. |
| 2005/0251028 A1 | 11/2005 | Boese et al. |
| 2005/0267373 A1 | 12/2005 | Lee |
| 2006/0020204 A1 | 1/2006 | Serra et al. |
| 2006/0024132 A1 | 2/2006 | Seman |
| 2006/0026761 A1 | 2/2006 | Falbo |
| 2006/0122630 A1 | 6/2006 | Daum et al. |
| 2006/0133580 A1 | 6/2006 | Vezina |
| 2006/0133657 A1* | 6/2006 | Schmid ............... G01N 15/042 382/128 |
| 2006/0182320 A1 | 8/2006 | Peszynski et al. |
| 2006/0221942 A1 | 10/2006 | Fruth et al. |
| 2006/0241408 A1 | 10/2006 | Yakubovsky et al. |
| 2006/0241432 A1 | 10/2006 | Herline et al. |
| 2007/0016003 A1 | 1/2007 | Piron et al. |
| 2007/0038144 A1 | 2/2007 | Hughes et al. |
| 2007/0039101 A1 | 2/2007 | Luginbuhl et al. |
| 2007/0050908 A1 | 3/2007 | Kogan et al. |
| 2007/0076983 A1* | 4/2007 | Doerrer ............... G02B 21/367 382/295 |
| 2007/0083117 A1 | 4/2007 | Sakas et al. |
| 2007/0092059 A1 | 4/2007 | Eberhard et al. |
| 2007/0149878 A1 | 6/2007 | Hankins |
| 2007/0161935 A1 | 7/2007 | Torrie et al. |
| 2007/0167705 A1 | 7/2007 | Chiang et al. |
| 2007/0167769 A1 | 7/2007 | Ikuma et al. |
| 2007/0167787 A1 | 7/2007 | Glossop et al. |
| 2007/0167801 A1 | 7/2007 | Webler et al. |
| 2007/0232882 A1 | 10/2007 | Glossop et al. |
| 2007/0233157 A1 | 10/2007 | Mark et al. |
| 2007/0238949 A1 | 10/2007 | Wang et al. |
| 2007/0238954 A1 | 10/2007 | White et al. |
| 2007/0255168 A1 | 11/2007 | Hibner et al. |
| 2007/0255170 A1 | 11/2007 | Hibner et al. |
| 2007/0262983 A1 | 11/2007 | Choi |
| 2007/0276234 A1 | 11/2007 | Shahidi |
| 2008/0005838 A1 | 1/2008 | Wan Fong et al. |
| 2008/0009724 A1 | 1/2008 | Lee et al. |
| 2008/0033454 A1 | 2/2008 | Lukoschek et al. |
| 2008/0077005 A1 | 3/2008 | Piron et al. |
| 2008/0095421 A1 | 4/2008 | Sun et al. |
| 2008/0132785 A1 | 6/2008 | Piron et al. |
| 2008/0132912 A1 | 6/2008 | Shabaz |
| 2008/0216239 A1 | 9/2008 | Luginbuhl et al. |
| 2008/0230074 A1 | 9/2008 | Zheng et al. |
| 2008/0234569 A1 | 9/2008 | Tidhar et al. |
| 2008/0240533 A1 | 10/2008 | Piron et al. |
| 2008/0255443 A1 | 10/2008 | Piron et al. |
| 2008/0269604 A1 | 10/2008 | Boctor et al. |
| 2008/0306377 A1 | 12/2008 | Piron et al. |
| 2009/0024030 A1 | 1/2009 | Lachaine et al. |
| 2009/0054764 A1 | 2/2009 | Adler et al. |
| 2009/0086925 A1 | 4/2009 | Xu et al. |
| 2009/0124906 A1 | 5/2009 | Caluser |
| 2009/0149738 A1 | 6/2009 | Piron et al. |
| 2009/0156961 A1 | 6/2009 | Tsonton et al. |
| 2009/0191585 A1* | 7/2009 | Yamada ............. G01N 15/1475 435/34 |
| 2009/0216110 A1 | 8/2009 | Piron et al. |
| 2009/0222229 A1 | 9/2009 | Kakinami |
| 2009/0234175 A1 | 9/2009 | Maier |
| 2009/0247861 A1 | 10/2009 | Manus et al. |
| 2009/0270725 A1 | 10/2009 | Leimbach et al. |
| 2009/0275830 A1 | 11/2009 | Falco et al. |
| 2009/0307915 A1 | 12/2009 | Sutherland |
| 2010/0041990 A1 | 2/2010 | Schlitt et al. |
| 2010/0041996 A1 | 2/2010 | Nygaard et al. |
| 2010/0179428 A1 | 7/2010 | Pedersen et al. |
| 2010/0249595 A1 | 9/2010 | Xu et al. |
| 2010/0265163 A1 | 10/2010 | Legerton et al. |
| 2010/0280354 A1 | 11/2010 | Zhang et al. |
| 2010/0324445 A1 | 12/2010 | Mollere et al. |
| 2010/0324448 A1 | 12/2010 | Mollere |
| 2011/0034796 A1 | 2/2011 | Ma et al. |
| 2011/0134113 A1 | 6/2011 | Ma et al. |
| 2011/0152714 A1 | 6/2011 | Luginbuhl et al. |
| 2011/0153254 A1 | 6/2011 | Hartov et al. |
| 2011/0173753 A1 | 7/2011 | Luginbuhl et al. |
| 2011/0234582 A1 | 9/2011 | Daiku et al. |
| 2012/0093385 A1 | 4/2012 | Yokosawa et al. |
| 2012/0123563 A1 | 5/2012 | Drinkard |
| 2012/0147010 A1* | 6/2012 | Schmidt ............... G06F 19/321 345/440 |
| 2012/0172704 A1 | 7/2012 | Piron et al. |
| 2012/0195484 A1 | 8/2012 | Ren et al. |
| 2012/0243755 A1* | 9/2012 | Kaufman ............. G06F 19/321 382/128 |
| 2012/0275675 A1 | 11/2012 | Piron et al. |
| 2013/0002847 A1* | 1/2013 | Zahniser ............ G01N 15/1475 348/79 |
| 2013/0028469 A1 | 1/2013 | Lee et al. |
| 2013/0053684 A1 | 2/2013 | Piron et al. |
| 2013/0290225 A1* | 10/2013 | Kamath ............. G06K 9/00127 706/12 |
| 2014/0018607 A1 | 1/2014 | Maier |
| 2014/0044325 A1 | 2/2014 | Ma et al. |

FOREIGN PATENT DOCUMENTS

| | | |
|---|---|---|
| EP | 0396866 A2 | 11/1990 |
| EP | 0753758 A1 | 1/1997 |
| EP | 2445413 A1 | 5/2012 |
| EP | 2503934 A1 | 10/2012 |
| WO | 9608199 A1 | 3/1996 |
| WO | 01/00083 A1 | 1/2001 |
| WO | 01/28412 A1 | 4/2001 |
| WO | 02/39135 A2 | 5/2002 |
| WO | 2006017172 A1 | 2/2006 |
| WO | 2006026465 A2 | 3/2006 |
| WO | 2007070285 A2 | 6/2007 |
| WO | 2008064271 A2 | 5/2008 |
| WO | 2008121367 A1 | 10/2008 |
| WO | 2010078048 A2 | 7/2010 |
| WO | 2010148503 A1 | 12/2010 |
| WO | 2011014966 A1 | 2/2011 |
| WO | 2011134113 A1 | 11/2011 |
| WO | 2013001377 A2 | 1/2013 |

OTHER PUBLICATIONS

General Electric—Press Release—"GE Healthcare Introduces Ultrasound Fusion; New LOGIQ E9 Merges Real-time Ultrasound with CT, MR and PET," Sep. 2, 2008, 2 pages.

International Preliminary Report of Patentability for International Application No. PCT/CA2010/001871 dated May 30, 2012, 1 page.

International Search Report and Written Opinion of the International Searching Authority for International Application No. PCT/CA2010/001871 dated Mar. 8, 2011, 9 pages.

M. Berger, "Image Fusion and Needle Guidance in Ultrasound", General Electric, Power Point Presentation, date unknown, 17 pages.

P. Mullen and C. Owen, "MR, Ultrasound Fusion: Bridging the Gap Between Clinical Benefits, Access and Equipment Utilization," SignaPULSE—A GE Healthcare MR Publication, Spring 2009, 5 pages.

International Search Report for International Application No. PCT/CA2010/001228 mailed Oct. 2, 2011, 5 pages.

European Search Report mailed Mar. 1, 2012 for European Patent Application No. 07800538.6, 8 pages.

European Search Report for European Patent Application No. 07800538.6 mailed Mar. 1, 2012, 8 pages.

Piron, Cameron A., Hybrid Imaging Guidance System for Biopsy of the Breast, Thesis Paper, University of Toronto, 2001.

Palmer, Gregory, et al., "Optimal Methods for Fluorescence and Diffuse Reflectance Measurements of Tissue Biopsy Samples," Lasers in Surgery and Medicine, 30:191-200 (2002).

(56) References Cited

OTHER PUBLICATIONS

Kline, Nicole; et al., "Raman Chemical Imaging of Breast Tissue," Journal of Raman Spectroscopy, vol. 28, 119-124 (1997).
Manoharan, Ramasamy, et al., "Histochemical Analysis of Biological Tissues Using Raman Spectroscopy," Spectrochimica Acta Part A.52 (1996) 215-249.
Shafer-Peltier, K.E. et al. "Raman Microspectroscopic Model of Human Breast Tissue: Implications for Breast Cancer Diagnosis in Vivo" Journal of Raman Spectroscopy V.33 (2002).
Niziachristos V., et al. "Concurrent MRI and Diffuse Optical Tomography of Breast After Indocyanine Green Enhancement," PNAS, Mar. 14, 2000, vol. 97, No. 6, 2767-2772.
Buadu LD, et al., Breast Lesions: Correlation of Contrast Medium Enhancement Patterns on MR Images with Histopathologic Findings and Tumor Angiogenesis.
Kriege, M., et al., "Efficacy of MRI and Mammography for Breast-Cancer Screening in Women with Familial or Genetic Predisposition," N Engl J Med 351:427-437 (2004).
Non-Final Office Action mailed Feb. 9, 2007 in U.S. Appl. No. 10/916,738.
Response to Feb. 9, 2007 Office Action in U.S. Appl. No. 10/916,738, Jul. 11, 2007.
Non-Final Office Action mailed Sep. 24, 2007 in U.S. Appl. No. 10/916,738.
Response to Sep. 24, 2007 Office Action in U.S. Appl. No. 10/916,738, Dec. 26, 2007.
Non-Final Office Action mailed Nov. 16, 2009 in U.S. Appl. No. 11/442,944.
Response to Nov. 16, 2009 Office Action in U.S. Appl. No. 11/442,944, May 17, 2010.
Non-Final Office Action mailed May 12, 2009 in U.S. Appl. No. 12/031,271.
Response to May 12, 2009 Office Action in U.S. Appl. No. 12/031,271, Nov. 12, 2009.
Final Office Action mailed Feb. 5, 2010 in U.S. Appl. No. 12/031,271.
Response to Feb. 5, 2010 Office Action in U.S. Appl. No. 12/031,271, Aug. 5, 2010.
Non-Final Office Action mailed Jan. 22, 2010 in U.S. Appl. No. 11/447,053.
Response to Jan. 22, 2010 Office Action in U.S. Appl. No. 11/447,053, Jul. 22, 2010.
International Search Report mailed Dec. 13, 2007 in International Application No. PCT/CA2007/001513.
International Preliminary Report on Patentability issued Mar. 3, 2009 in International Application No. PCT/CA2007/001513.
European Search Report mailed Jul. 30, 2009 in EP Application No. 09007010.3.
European Search Report mailed Oct. 16, 2009 in EP Application No. 09007010.3.
Update of AAPM Task Group No. 43 Report, A revised AAPM protocol for brachytherapy does calculations; Med. Phys. vol. 31 No. 3, Mar. 2004; pp. 633-674.
Supplement to the 2004 update of the AAPM Task Group No. 43 Report; Med. Phys. vol. 34 No. 6, Jun. 2007; pp. 2187-2206.
Erratum: "Update of AAPM Task Group No. 43 Report: A revised AAPM protocol for brachytherapy dose calculations" [Med. Phys. 31, 633-674 (2004)].
International Preliminary Report on Patentability for PCT/CA10/000973, dated Jan. 4, 2012.
International Search Report for International Application No. PCT/CA2010/000973, mailed Oct. 1, 2010, 3 pages.
Pagoulatos et al., "Interactive 3-D Registration of Ultrasound and Magnetic Resonance Images Based on a Magnetic Position Sensor," IEEE Transactions on Information Technology in Biomedicine, vol. 3, No. 4, Dec. 1999, 11 pages.
Notification of Transmittal of the International Search Report and the Written Opinion of the International Searching Authority, or the Declaration for International Application No. PCT/US2013/053947, mailed Nov. 13, 2013, 10 pages.
Chen et al., A Real-Time Freehand Ultrasound Calibration System with Automatic Accuracy Feedback and Control, Jan. 2009. Ultrasound in Medicine and Biology, vol. 35, No. 1,pp. 79-93.
Duanggate, et al., "A Review of Image Analysis and Pattern Classification Techniques for Automatic Pap Smear Screening Process", International Conference on Embedded Systems and Intelligent Technology, Feb. 27, 2008, pp. 212-217.
Eichhorn, et al., "Internet-Based Gynecologic Telecytology With Remote Automated Image Selection: Results of a First-Phase Development Trial", American Journal of Clinical Pathology, Jan. 1, 2008, pp. 1-6.
Estepar et al., "Toward Scarless Surgery: An Endoscopic Ultrasound Navigation System for Transgastic Access Procedures", Computer Aided Surgery, 12 (6), Nov. 2007, pp. 311-324.
Gurcan, et al., "Histopathological Image Analysis: A Review", IEE Reviews in Biomedical Engineering, IEEE, USA, vol. 2, Jan. 1, 2009, pp. 147-171.
Khamene et al., "A Novel Phantom-Less Spatial and Temporal Ultrasound Calbration Method", Medical Image Computing and Computer-Assisted Intervention, 2005, pp. 65-72.
Kondziolka, et al.. "A Comparison between Magnetic Resonance Imaging and Computed Tomography for Sterotactic Coordinate Deteremination", Neurosurgery, vol. 30, No. 3, Mar. 1992, pp. 402-407.
Notification of Transmittal of the International Search Report and the Written Opinion of the International Searching Authority from corresponding PCT/US2014/022787 mailed Aug. 5, 2014.
Pantanowitz et al: "Computer Assisted Cervical Cytology" In: "Medical Informatics in Obstetrics and Gynecology"; Jan. 1, 2009 (Jan. 1, 2009). Hershey, XP055131392; p. 161, 169, 173-176.
Thrall, et al., "Telecytology: Clinical Applictions, Current Challenges, and Future Benefits", Journal of Pathology Informatics, vol. 2, No. 1, Dec. 26, 2011, 9 pages.
Weinstein, et al., "Overview of Telephathology, Virtual Microscopy, and Whole Slide Imaging: Prospects for the Future", Human Pathology, vol. 40, No. 8, Apr. 9, 2009, pp. 1057-1069.
International Search Report and Written Opinion mailed Aug. 5, 2014, in PCT Application No. PCT/US2014/022787, 14 Pages.

\* cited by examiner

SYSTEM AND METHOD FOR REVIEWING AND ANALYZING CYTOLOGICAL SPECIMENS

RELATED APPLICATIONS

This application claims the benefit under 35 U.S.C. §119 of U.S. Provisional Application No. 61/787,975 filed Mar. 15, 2013, the contents of which are hereby incorporated by reference in their entirety.

FIELD

The present disclosure relates generally to systems and methods for reviewing and analyzing cytological specimens. In particular, the disclosed systems and methods facilitate classification of cytological specimens.

BACKGROUND

Modern technology, including continued advances in the interrelated fields of microprocessors, computer memory, computer displays, and user interfaces, can be used to solve problems and fulfill unmet needs in cytology. For instance, U.S. Pat. No. 8,041,091, the contents of which are fully incorporated by reference as if set forth in full, describes an image analysis system used in ophthalmology.

Current systems for reviewing and analyzing cytological specimens include relatively expensive review microscopes or review stations. Further, current methods for reviewing and analyzing cytological specimens are often labor intensive and time-consuming. These demanding methods can lead to errors, such as false negatives and false positives, in the review and analysis of cytological specimens.

SUMMARY

The user interface of cytological specimen review and analysis systems can be improved to better facilitate review of cytological specimens and objects of interest ("OOI") identified therein. Thus, improved systems and methods for rapidly and intuitively analyzing OOIs and navigating through large amounts of image data would be highly desirable. Further, improved systems and methods for analyzing cytological specimens that reduce the chances of false negatives and false positives occurring during the specimen slide review process also would be highly desirable. Improvements such as those listed above would make cytological review and analysis systems and methods more simple, more elegant, and suitable for more applications.

In one embodiment of the disclosed inventions, a system to facilitate a review and analysis of cytological specimens, includes at least one machine, the at least one machine respectively including a processor communicatively coupled to a storage device storing computer-executable instructions, which instructions, when executed by the processor, cause the processor to operate as: (i) a record module configured to request and permit the importing cytological specimen image data, the image data comprising digital images of cytological specimens; (ii) an image set module configured to analyze imported image data of cytological specimens, and to generate respective image sets and analysis information thereof for conducting individual specimen reviews based upon feature attributes of objects of interest in the cytological specimen images; and (iii) an analysis tool configured to display to a user the images sets and analysis information generated by the image set module, wherein the analysis tool is further configured to collect inputs and instructions from the user via one or more tools of a user interface, and to cause additional specimen image data to be acquired and/or analyzed by the record module and/or image set module.

In some embodiments of the review and analysis system, the imported image data further comprises one or both of feature attributes and locations of objects of interest in the cytological specimen images. In various embodiments, the image set module is configured to analyze the imported image data of cytological specimens, and to generate respective image sets and analysis information thereof for conducting individual specimen reviews, further based upon location information of the objects of interest in the cytological specimen images. The computer-executable instructions, when executed by the processor, cause the processor to further operate as an image processing module configured to extract one or both of feature attributes and locations of objects of interest in the cytological specimen images.

In various embodiments, the image set module generates respective image sets in response to user input received by the analysis tool. In some embodiments, the review and analysis system further comprises a graphical user interface. In particular embodiments, the review and analysis system further comprises a voice recognition user interface. The image set module is configured to selectively enhance objects in images of the image sets. In various embodiments, the image set module enhances objects depicted in images of the image sets by changes in contrast and/or brightness of the depicted objects. The analysis tool includes one or more of a log-in module, a main page module, a patient module, a patient dashboard, and an image explorer. The log-in module is configured to accept user identification credentials including a user name and password. The main page module includes a user dashboard, a patient list, a search page, and a new patient module, and wherein the user dashboard includes a list of submitted analysis jobs and status of the submitted analysis jobs. The patient dashboard comprises cytological specimen images related to a patient identified by the dashboard, and/or analysis results relevant for the patient identified by the dashboard. The patient dashboard includes means to submit new analyses for a patient identified by the dashboard.

In some embodiments, a method employing a processor-controlled device for navigating through and reviewing cytological image data, the image data comprising images of a cytological specimen including individual images of objects of interest therein, the method comprises causing a plurality of images from the image data to be displayed on a display integrated or otherwise operatively associated with the device, each of the displayed images of the plurality depicting a respective object of interest in the specimen, and selecting one of the displayed images via a user interface integrated with or otherwise operatively associated with the device, thereby causing the device to display on the display an image of at least a portion of the specimen including the respective object of interest depicted in the selected image along with neighboring objects in the specimen. The display comprises the user interface. In some embodiments, the image of at least a portion of the specimen is displayed at a magnification appropriate for cytological review of the respective object of interest depicted in the selected image of the plurality.

In various embodiments, the method of employing a processor-controlled device for navigating through and reviewing cytological image data further comprises highlighting in the image of at least a portion of the specimen, the respective object of interest depicted in the selected image of the plurality. The highlighting comprises changes in contrast and/or brightness of the depicted objects. The displayed plurality of images depicting respective objects of interest and the image of at least a portion of the specimen are displayed in different areas of the display.

In some embodiments, a method employing a processor-controlled device for navigating through and reviewing cytological image data, the image data comprising images of a cytological specimen including individual images of objects of interest therein, the method comprises causing a first plurality of images from the image data to be displayed on a display integrated or otherwise operatively associated with the device, each of the displayed images of the first plurality depicting a respective object of interest in the specimen, and selecting one of the displayed images via a user interface operatively associated with the device, thereby causing the device to display on the display a second plurality of images, each image of the second plurality depicting a cytological object having a characteristic similar to a characteristic of the respective object of interest in the selected image from the first plurality. The second plurality of images is obtained from a library of previously categorized cytological objects. The second plurality of images depict additional cytological objects in the specimen.

In various embodiments, a method employing a processor-controlled device for navigating through and reviewing cytological image data, the image data comprising images of a cytological specimen including individual images of objects of interest therein, the method comprises (i) causing a first plurality of images from the image data to be displayed on a display integrated with or otherwise operatively associated with the device, each of the displayed images of the first plurality depicting a respective object of interest in the specimen, (ii) selecting one of the displayed images via a user interface integrated with or operatively associated with the device, thereby causing the device to display on the display a list of metric values computed for the respective object of interest in the selected image, and (iii) selecting via the user interface a metric value from the list, thereby causing the device to display on the display a second plurality of images, each image of the second plurality depicting a cytological object having a same or similar computed metric value as the selected metric value from the list. In some embodiments, the second plurality of images is obtained from a library of previously categorized cytological objects. The second plurality of images depict additional cytological objects in the specimen.

In various embodiments, an automated method employing a processor-controlled device for navigating through and reviewing cytological image data, the image data comprising images of a cytological specimen including individual images of objects of interest therein, the device comprising an integrated or otherwise operatively associated user interface and display, the method comprises in response to one or more user commands received through the user interface, displaying a first plurality of images from the image data on the display, each image of the first plurality depicting a respective object of interest in the specimen; detecting through the user interface a user selection of an image of the first plurality; and in response to the detected user selection, displaying on the display one or more of: (a) an image of at least a portion of the specimen including the respective object of interest depicted in the selected image along with neighboring objects in the specimen, and (b) a second plurality of images, each image of the second plurality depicting a cytological object having (i) a characteristic similar to a characteristic of the respective object of interest in the selected image from the first plurality, or (ii) a same or similar computed metric value as a selected metric value of the respective object of interest in the selected image. The second plurality of images is obtained from a library of previously categorized cytological objects. The second plurality of images depict additional cytological objects in the specimen. The image of at least portion of the specimen is displayed at a magnification appropriate for cytological review of the respective object of interest depicted in the selected image of the plurality. In some embodiments, the automated method employing a processor-controlled device for navigating through and reviewing cytological image data further comprises highlighting in the image of at least portion of the specimen, the respective object of interest depicted in the selected image of the plurality.

In some embodiments, the automated method employing a processor-controlled device for navigating through and reviewing cytological image data further comprises receiving input representing a user-proposed classification of a displayed object of interest in the first plurality of images, and providing feedback as to the user-proposed classification in view of a previously determined classification of the selected object of interest. In various embodiments, the automated method employing a processor-controlled device for navigating through and reviewing cytological image data further comprises receiving input representing a user-proposed classification of a displayed object of interest in the first plurality of images; and determining a percentage of user-proposed classifications that match respective previously-determined classifications of the respective object of interest.

In some embodiments, a system for navigating through and reviewing imported cytological specimen image data, the imported cytological specimen image data comprising images of a cytological specimen, the system comprises a processor, a display integrated or otherwise operatively associated with the processor, a user interface operatively coupled to the processor and display, wherein the processor is configured to display a first plurality of images from the image data on the display, each image of the first plurality depicting a respective object of interest in the specimen, detect through the user interface a user selection of an image of the first plurality, and in response to the detected user selection, display on the display one or more of (a) an image of at least a portion of the specimen including the respective object of interest depicted in the selected image along with neighboring objects in the specimen, and (b) a second plurality of images, each image of the second plurality depicting a cytological object having (i) a characteristic similar to a characteristic of the respective object of interest in the selected image from the first plurality, or (ii) a same or similar computed metric value as the selected metric value from the list.

The imported cytological specimen image data further comprises one or both of feature attributes and locations of objects of interest in the cytological specimen images. The processor is programmed or otherwise configured to extract one or both of feature attributes and locations of objects of interest in the imported cytological specimen images. The processor is programmed or otherwise configured to generate the first plurality of images in response to user input via the user interface. In some embodiments, the user interface comprises a voice recognition system. The processor is configured to selectively enhance objects depicted in displayed images. The objects depicted in displayed images are enhanced by changes in contrast and/or brightness. The processor is programmed or otherwise configured to obtain the second plurality of images from a library of previously categorized cytological objects. The processor is programmed or otherwise configured to obtain the second plurality of images from a set of cytological objects in the specimen. The processor is programmed or otherwise configured to display the image of at least portion of the specimen at a magnification appropriate for cytological review of the respective object of interest depicted in the selected image of the plurality of images. In some embodiments, the display comprises the user interface. The processor is programmed or otherwise configured to display the first plurality of images and the image of at least a portion of the specimen or a second plurality of images are displayed in different areas of the display.

In various embodiments, the system for navigating through and reviewing imported cytological specimen image data is further configured to receive input representing a user-proposed classification of a displayed object of interest in the first plurality of images; and providing feedback as to the user-proposed classification in view of a previously determined classification of the selected object of interest. The system for navigating through and reviewing imported cytological specimen image data is further configured to receive input representing a user-proposed classification of a displayed object of interest in the first plurality of images, and determine a percentage of user-proposed classifications that match respective previously-determined classifications of the respective object of interest.

In various embodiments, a computer-assisted method of classifying images of a cytological specimen, comprises the acts of analyzing an image of the cytological specimen to identify an object of interest within the cytological specimen, displaying an image of the identified object of interest to a reviewer, determining at least one other object of interest similar to the selected object of interest in response to an input from the reviewer selecting the object of interest, and displaying an image of the at least one other object of interest and the selected object of interest so as to provide for comparison of the objects of interest by the reviewer. The act of displaying an image of the at least one other object of interest and the selected object of interest are within a comparison view. The image of the at least one other object of interest is provided from the same cytological specimen. The image of the at least one other object of interest is provided from a database of previously stored objects of interest. The image of the selected object of interest has a first stain and the image of the at least one other object of interest is the same selected object of interest having a second stain.

In various embodiments, the computer assisted method of classifying images of a cytological specimen further comprises determining and storing a classification of the selected object of interest with the image of the selected object of interest, wherein the classification is determined by the reviewer. In some embodiments, the computer assisted method of classifying images of a cytological specimen further comprises determining and storing a classification of the selected object of interest with the image of the selected object of interest, wherein the classification is determined by a processor. In some embodiments, the analyzing of the image of the cytological specimen is done by a processor. In particular embodiments, the computer assisted method of classifying images of a cytological specimen further comprises creating a database of classifications of the selected objects of interest with the image of the selected object of interest. In some embodiments, the method further comprises receiving images of the cytological specimen from a remote workstation.

In particular embodiments, a computer-assisted method of classifying images of a cytological specimen comprises the acts of analyzing an image of the cytological specimen to identify an object of interest within the cytological specimen, displaying an image of the identified object of interest to a reviewer, and in response to an input from the reviewer selecting the object of interest, determining a characteristic of the selected object of interest, determining at least one other object of interest having a similar characteristic to the selected object of interest, and displaying an image of the selected object of interest and the at least one other object of interest so as to provide for comparison of the objects of interest by the reviewer. The image of the at least one other object of interest is provided from the same cytological specimen. The image of the at least one other object of interest is provided from a database of previously stored objects of interest. The image of the identified object of interest has a first stain and the at least one other object of interest is the same identified object of interest having a second stain.

In various embodiments, the computer-assisted method of classifying images of a cytological specimen further comprises determining and storing a classification of the identified object of interest with the image of the identified object of interest, wherein the classification is determined by the reviewer. In some embodiments, the computer-assisted method of classifying images of a cytological specimen further comprises determining and storing a classification of the identified object of interest with the image of the identified object of interest, wherein the classification is determined by a processor. In various embodiments, the analyzing of the image of the cytological specimen is done by a processor. In particular embodiments, the computer-assisted method of classifying images of a cytological specimen further comprises creating a database of classifications of the selected objects of interest with the image of the selected object of interest. In some embodiments, the computer-assisted method of classifying images of a cytological specimen further comprises receiving images of the cytological specimen from a remote workstation.

In various embodiments, a computer-assisted method of navigating images of a cytological specimen, comprises the acts of analyzing an image of the cytological specimen to identify objects of interest within the cytological specimen, displaying an image of respective identified objects of interest to a reviewer, and in response to input from the reviewer selecting an object of interest, displaying a field of view of the selected object of interest and neighboring objects of interest so as to provide for the reviewer to view the selected object of interest and the neighboring objects of interest in the field of view. The respective identified objects of interest are displayed to the reviewer in a scroll bar. In various embodiments, the computer-assisted method of navigating images of a cytological specimen further comprises determining and storing a classification of the selected object of interest with the image of the selected object of interest, wherein the classification is determined by the reviewer. In other embodiments, the computer-assisted method of navigating images of a cytological specimen further comprises determining and storing a classification of the selected object of interest with the image of the selected object of interest, wherein the classification is determined by a processor. In some embodiments, the analyzing of the image of the cytological specimen is done by a processor. In various embodiments, the computer-assisted method of navigating images of a cytological specimen further comprises creating a database of classifications of the selected objects of interest with the image of the selected object of interest. In some embodiments, the method further comprises receiving images of the cytological specimen from a remote workstation.

In particular embodiments, a system for navigating within an image of a cytological specimen, the system comprises at least one processor operatively connected to a memory, a user interface display, an identification component, executed by the at least one processor, configured to identify objects of interest within the image, a user interface component, executed by the at least one processor, configured to display the objects of interest within the user interface display, wherein the user interface component is configured to accept a user selection of an object of interest to display the selected object of interest and at least one other object of interest having similar features to the selected object of interest so as to provide for comparison of the objects of interest by the reviewer.

In various embodiments, the user interface component is configured to display the selected object of interest and the at least one other object of interest in a comparison view. The user interface component is configured to accept the user selection of the object of interest to display the selected object of interest in a field of view that includes the selected object of interest and neighboring objects of interest. The system is configured to accept the user selection of the object of interest and to display a menu of cellular characteristics of the object of interest. The system is configured to accept selection of a cellular characteristic from the menu of cellular characteristics and to identify additional objects of interest having the selected cellular characteristic. The cellular characteristics include any of: morphological characteristics, stains (e.g., chromogenic, fluorescent, dual, etc.), cell size, nucleus/cytoplasm ratio, optical density, regularity of contour, color based criteria, and nucleic density. In some embodiments, the system is configured to identify and display different images of the selected object of interest. In some embodiments, the system is configured to identify the object of interest having at least one of a traditional stain, advanced stain, color image, fluorescent stain, and is configured to accept user selection of the object of interest and to display a respective image of the object of interest with such stain.

Various aspects, embodiments, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Features and advantages discussed in connection with any one or more embodiments according to one or more aspects are not intended to be excluded from a similar role in any other embodiment or aspect.

BRIEF DESCRIPTION OF THE DRAWINGS

The drawings illustrate the design and utility of embodiments of the disclosed inventions, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments of the disclosed inventions and are not therefore to be considered limiting of its scope.

DETAILED DESCRIPTION

Figure 1:
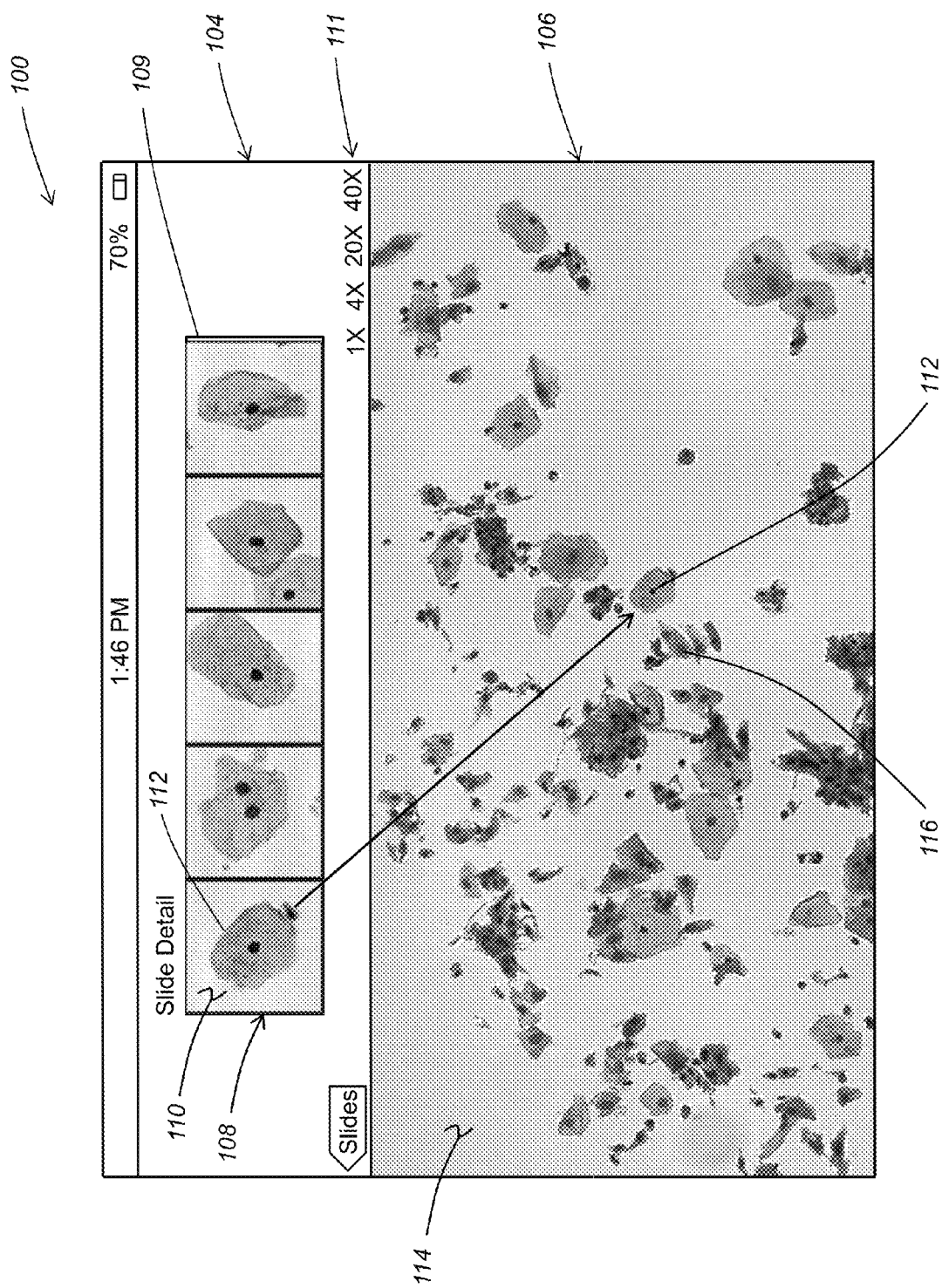
FIG. 1 is a screen-shot of a display monitor of a cytological specimen review system showing an example mode of operation in accordance with embodiments of the disclosed inventions.

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

Various embodiments of the disclosed inventions are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention, which is defined only by the appended claims and their equivalents. In addition, an illustrated embodiment of the disclosed inventions needs not have all the aspects or advantages shown. An aspect or an advantage described in conjunction with a particular embodiment of the disclosed inventions is not necessarily limited to that embodiment and can be practiced in any other embodiments even if not so illustrated.

Figure 4:
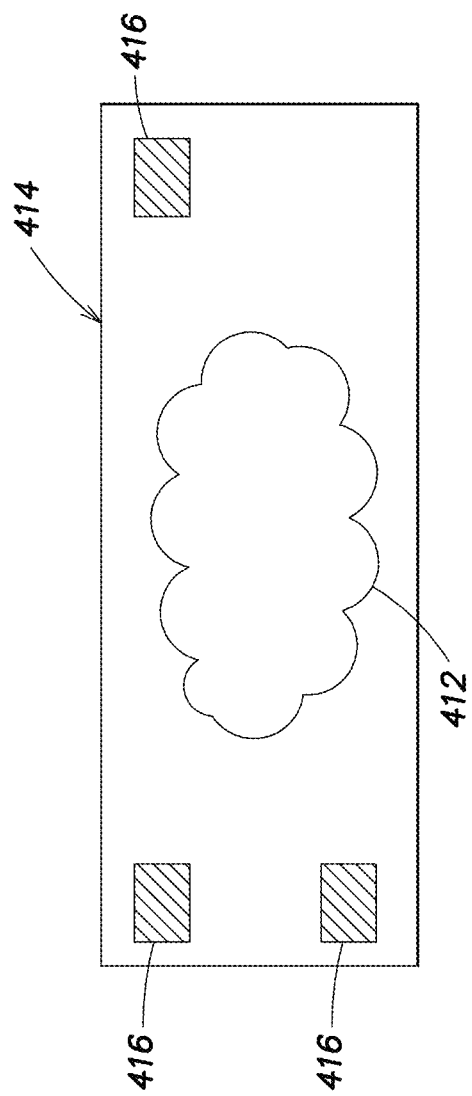
FIG. 4 is top view of a standard microscope slide carrying a cytological specimen.

Cytological specimen review and analysis systems 510 may receive cytological specimens 412 on microscope slides 414, and obtain and process images of the received cytological specimens 412 (described below with respect to FIG. 4). Alternatively, cytological specimen review and analysis systems 510 may receive previously obtained and processed image data, including data relating to previously identified objects of interest ("OOI"), for example, in the cytological specimen 412. In either case, the reviewing devices 522 described herein enable and facilitate detailed review and analysis of the cytological specimen 412. Cytological specimen image processing techniques for identifying OOIs and sorting the OOIs based on possible features (size, color, optical density, and regularity of boundaries) are described in U.S. Pat. No. 7,590,492, the contents of which are fully incorporated by reference as if set forth in full.

Figure 2:
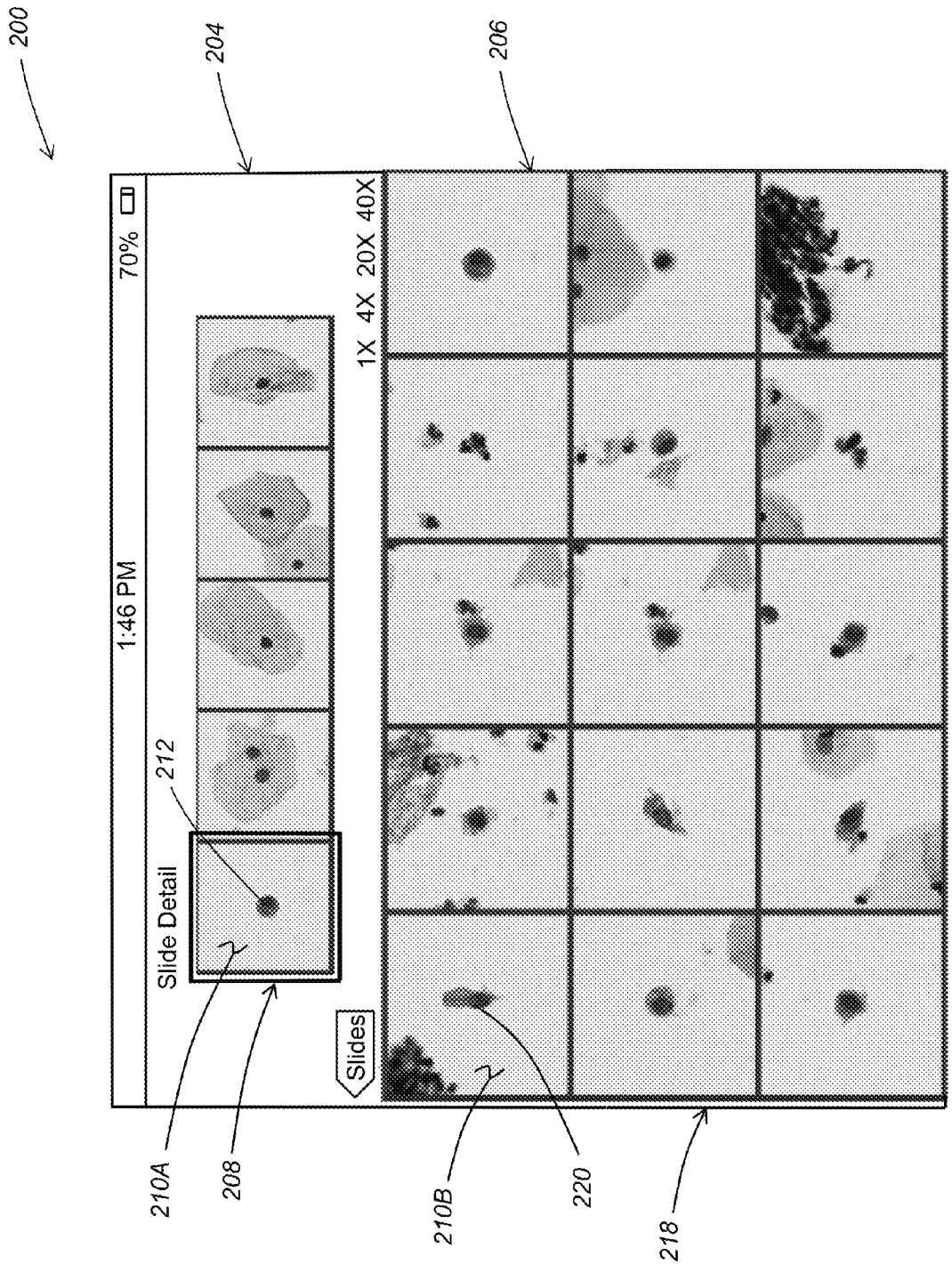
FIG. 2 is another screen-shot of a display monitor of a cytological specimen review system showing an example mode of operation in accordance with embodiments of the disclosed inventions.
Figure 3A:
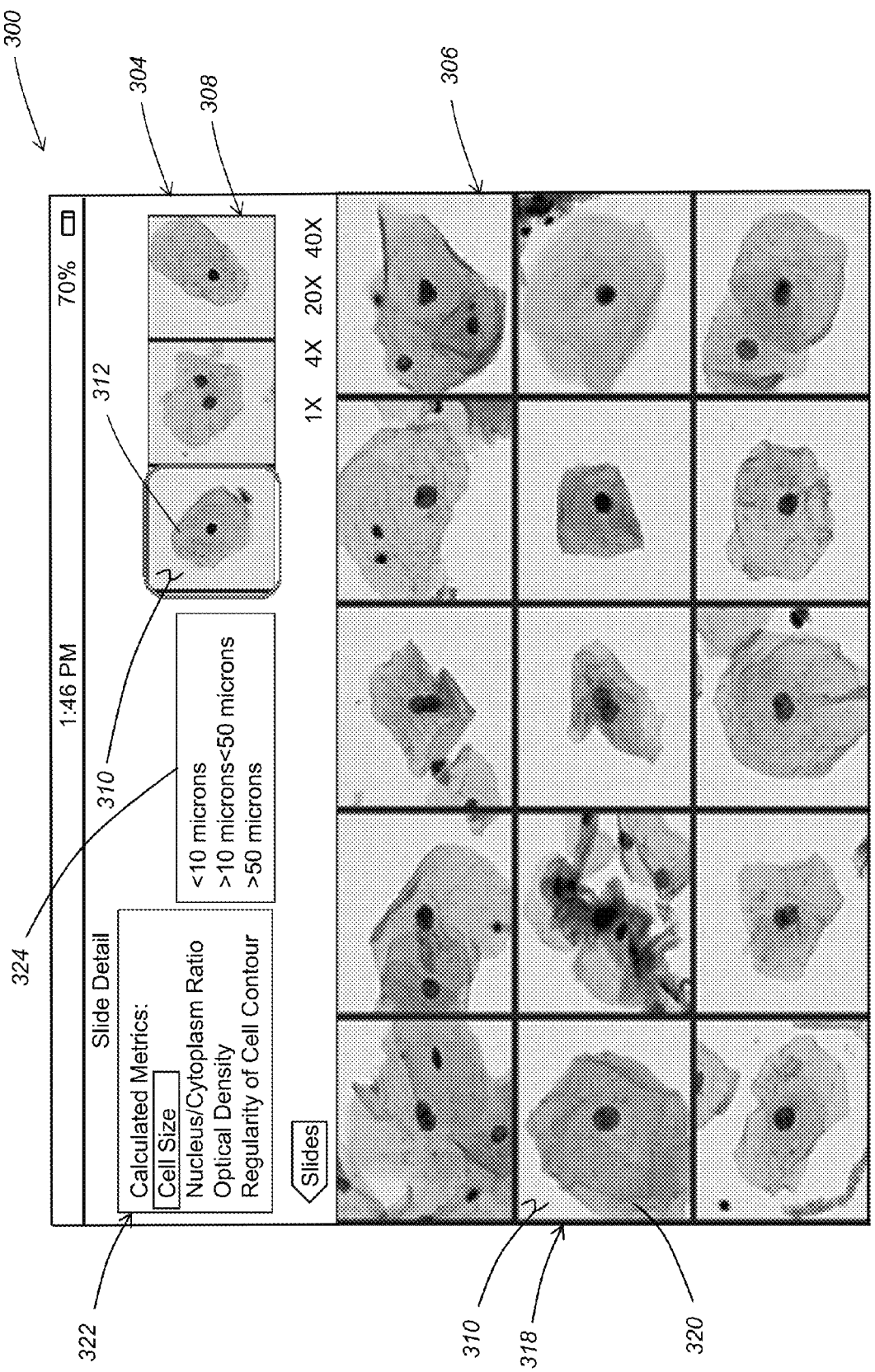
FIG. 3A is another screen-shot of a display monitor of a cytological specimen review system showing an example mode of operation in accordance with embodiments of the disclosed inventions.
Figure 3B:
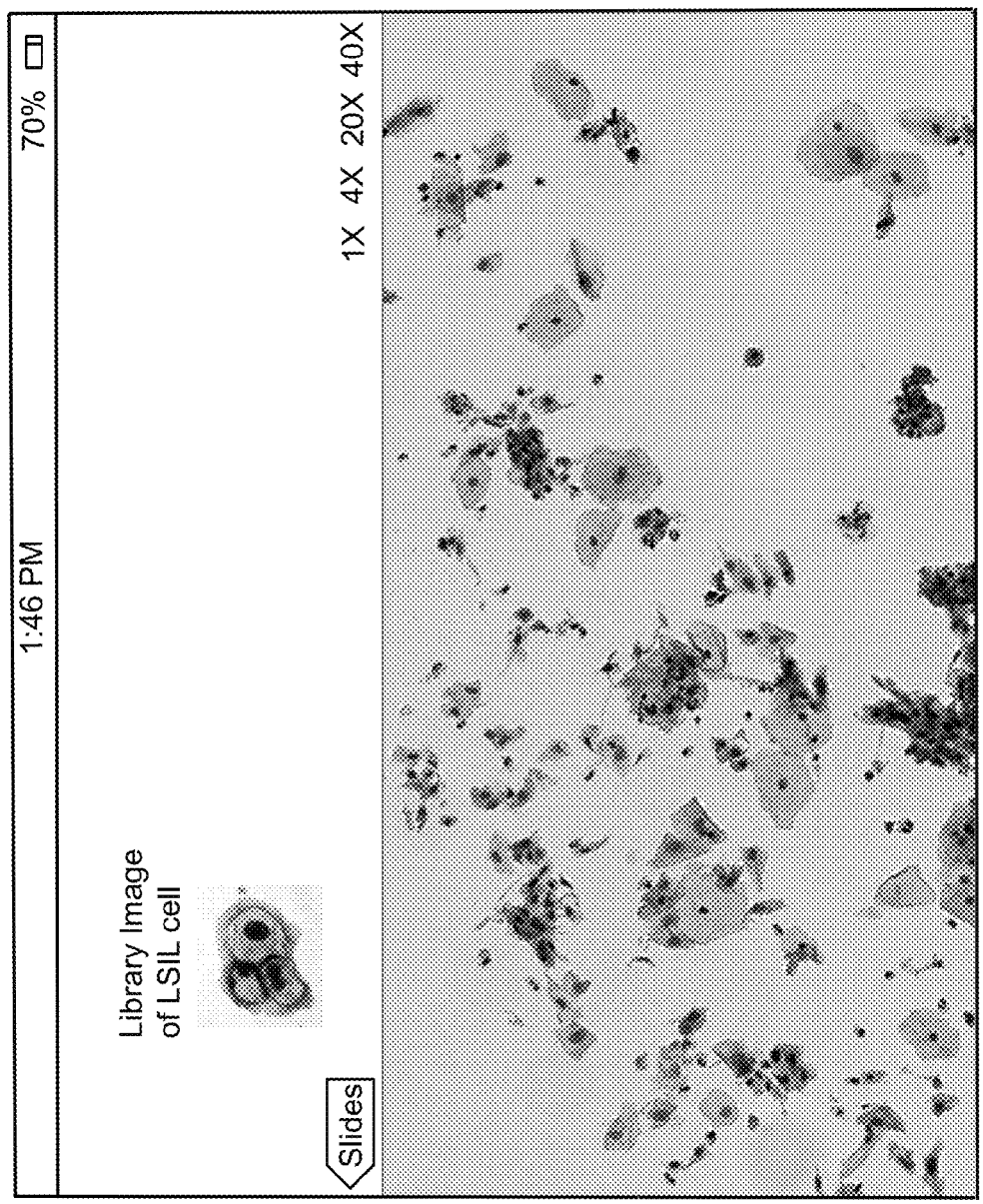
FIG. 3B is another screen-shot of a display monitor of a cytological specimen review system showing an example mode of operation in accordance with embodiments of the disclosed inventions.

In the embodiments depicted in FIGS. 1-3, a cytological specimen image reviewing device 522 is a tablet computer with a display monitor 500 which can include a touchscreen input device (e.g., a capacitive touch screen), or user interface. The reviewing device 522 has multiple modes of operation. Four examples of modes, depending on the user-inputted command are: (1) a "take me there" navigation mode (FIG. 1); (2) a "more like this" analysis tool mode (FIG. 2); (3) a "similar metrics" analysis tool mode (FIG. 3A); and (4) a "show me a reference image" (FIG. 3B). The display on the display monitor 500 is divided into top and bottom windows 104, 106, but may have side-by-side, galleries of thumbnail images, or otherwise separated windows.

In FIGS. 1-3B, a first plurality 108 of detailed individual images, i.e., thumbnail images 110, of OOIs (e.g., 112) are displayed in the top window 104 of the display on the display monitor 100. The first plurality 108 of thumbnail images 110 is displayed serially, but can be displayed in any arrangement. The thumbnail images 110 of OOIs (e.g., 112) may be displayed according to a predetermined ranking of the likelihoods that each OOI (e.g., 112) has a certain predetermined characteristic or other user/cytotechnologist selected order. In some examples, the display shown on the display monitor is organized into an upper and lower potion. Within the upper portion a ranked list of thumbnails of OOIs can be shown (e.g., at 108). Users may select images from within a display bar 109. The ranking within the displayed images can be based on system generated probabilities that the displayed image contains a feature or characteristic. In some examples, a reviewer (e.g., cytotechnologist) can establish a characteristic of interest, and the system can display ranked images of OOIs in an upper portion of the display accordingly. The bottom window 106 of the display monitor 100 displays various images, depending on the mode of the reviewing device (e.g., 522 of FIG. 5A). The magnification of the displayed images can be responsive to user selection. For example, the user may select from "1×," "4×," "20×," and "40×" at 111.

In some embodiments, the user can be provided visual aids for determining object size. For example, the user interface can be configured to display co-centric rings around OOIs. In some embodiments, the user interface can provide an area tool configured to visualize in the display responsive to user selection. The co-centric rings can each be labeled with a respective size dimension so that the reviewer can establish the object size and/or dimension with greater precision. In some examples, the user can select the co-centric rings and position them on the display, for example, using input device 502.

A cytotechnologist may enter the "take me there" navigation mode depicted in FIG. 1 by single tapping on a thumbnail image (e.g., 110) of an OOI (e.g., 112) displayed in the top window 104. The cytotechnologist may select the thumbnail image (e.g., 110) using a touchscreen input device (e.g., 502, FIG. 5A) of the tablet computer reviewing device 522. With other input devices (e.g., 502), the selection may be made using a mouse (button clicks and/or mouse-over), voice recognition, and/or eye movements using an augmented reality head-mounted display.

Mouse clicks or touch screen controls, such as single tapping a thumbnail image of an OOI (e.g., 112), displays a larger field of view 114 centered on that OOI (e.g., 112). In some embodiments, the field of view display can be shown in a bottom window 106 shown on the display monitor 100. The larger field of view 114 is a more conventional image of the cytological specimen 412, for example, as may be seen through a microscope, line scanned, or digitally scanned image. In some examples, the larger field of view can be accessed from a database of cytological specimen images, and the take me there navigation mode can be used to visualize OOIs from within a database of images. The larger field of view 114 in the bottom window 106 allows the cytotechnologist to view the OOI (e.g., 112) in context of neighboring objects 116. This allows manual comparison of features of the OOI (e.g., 112) and its neighbors 116 in the same field of view 114, facilitating classification of the OOI (e.g., 112) and the cytological specimen 412.

According to one embodiment, a cytotechnologist enters the "more like this" analysis tool mode depicted in FIG. 2, by mouse clicks or touch screen controls, such as double tapping a thumbnail image 210A of an OOI 212 displayed in the top portion or top window 204 shown on a display monitor 200. Mouse clicks or touch screen controls, such as double tapping a thumbnail image (e.g., 210A of an OOI 212) displays a second plurality 218 of thumbnail images (e.g., 210B) of similar objects (e.g., 220) in the bottom window 206 of the display monitor 200. The similarity of the objects (e.g., 220) to the selected OOI (e.g. 212) is determined by the characteristics used to identify the OOIs (e.g., 112) or other user-selected characteristics. In this case, the characteristics are cells with small diameters and high nuclear/cytoplasm ratios. Other characteristics may include color and regularity of boundaries.

According to one embodiment, the system determines similar objects from a specimen or a database of specimens. In some examples, the database of specimens can be predefined prior to review. In further examples, a reviewer can import reference images and/or add additional specimens for review. Based on objects identified in the specimens by the system, the system generates display galleries for a user to review. For example, the system can be configured to generate OOI display galleries. The images in the OOI display galleries can be selected automatically by the system and grouped or ranked according to cellular characteristics and/or the probability that a given OOI has a cellular characteristic. For example, automated analysis tools can identify features within cellular objects and the system can group/order OOI for display based on the identified features and/or the probability that a given object includes the indentified features. One ordering can be based on cell size or feature size, and the ordering can correspond to different categories associated with the features (e.g., basal to superficial).

The cytotechnologist enters the "same calculated metrics" analysis tool mode depicted in FIG. 3A by mouse clicks or touch screen controls, such as double tapping with two fingers on a thumbnail image (e.g., 310) of an OOI (e.g., 312) displayed in the top window 304 of the display monitor 300. Two finger double tapping a thumbnail image of an OOI (e.g., 312) opens a drop-down menu 322 of calculated metrics 324. Selecting one or more calculated metric 324 (in this case cell size greater than 50 microns) displays a second plurality of thumbnail images (e.g., 310) of similar objects (e.g., 320) having the selected calculated metrics in the bottom window 306 of the display monitor 300. Other calculated metrics include nucleus/cytoplasm ratio, optical density, and regularity of cell contour. In some embodiments, the system is configured to generate cell size ranges dynamically based on review of a slide and properties of the OOI discovered with the slide and/or digital image. In further embodiments, each selection of calculated metrics can be configured to display a number of matching OOI, so that the reviewer can identify whether a categories/characteristics distinguishes within a group of OOIs.

In a "show reference image" analysis tool mode, depicted in FIG. 3B, selecting an option from a menu in the top window causes a cell of the type described in the menu to be displayed in the bottom window. In the illustrated example, a field of view centered on an LSIL cell is displayed in the bottom window in response to a menu selection.

The similar objects displayed in the "more like this" or "same calculated metrics" analysis tool modes may be other objects on the microscope slide, previously reviewed objects on other slides, or pre-classified library objects with known characteristics and diagnoses. The similar objects are displayed for evaluation and comparison, which facilitates efficient classification of the entire cytological specimen (e.g., 412) or any image of a cytological specimen. For example, a reviewer can identify an OOI as a possible glandular cell, and request in the user interface, glandular cells from an already classified object library. Displaying the reviewer identified cell side by side with library objects facilitates efficient and consistent classification.

In one embodiment, the touchscreen 502 also allows the cytotechnologist to mark OOIs (e.g., 112), e.g., with a two-finger tap on either the thumbnail in the top window 104 or the OOI (e.g., 112) in the field of view in the bottom window 106 of the display monitor 100. Further, the touchscreen 502 can allow "manual" navigation using a touch and drag command in the bottom window 106 of the display monitor 100, for example, in "take me there" navigation mode.

As the selected OOIs (e.g., 112) are displayed in context and/or with similar objects, the cytotechnologist reviews the OOIs (e.g., 112) and makes decisions about the level of cell abnormality in the specimen 412, if any. The cytotechnologist can electronically mark or otherwise note any OOIs (e.g., 112) that are suspect in the display. The reviewing device 522 also enables the cytotechnologist to return to a previously viewed OOI (e.g., 112), and manually move to (and view) other fields of view not encompassing OOIs (e.g., 112) (e.g., by touch and dragging). The cytological specimen review system 510 can also be used to perform quality control of the review process and training of cytotechnologists. Quality control can include randomly displaying thumbnail images 110 of pre-categorized OOIs (e.g., 112) (positive and negative) in the top window 104 of the display monitor 100 and tracking the categorization of the OOI (e.g., 112) by the cytotechnologist. By way of illustration, U.S. patent application Ser. No. 13/427,251, the contents of which are fully incorporated by reference as if set forth in full, describes a method for automatically seeding previously-classified images among images of OOIs from a specimen for training and quality control. Training can include similar randomly displaying thumbnail images (e.g., 110) of pre-categorized OOIs (e.g., 112) with follow-up review. The "more like this" and "same calculated metrics" modes also facilitate training. Requesting the display of Library Images of known abnormalities for comparisons can also facilitate training.

In some embodiments, the user interface of the analysis tool may also include one or more of a log-in module, a main page module, a patient module, a patient dashboard, and an image explorer. The log-in module may be configured to accept user identification credentials including a user name and password. The main page module may include a user dashboard, a patient list, a search page, and a new patient module. The user dashboard may include a list of submitted analysis jobs and status of the submitted analysis jobs. The patient dashboard may include cytological specimen images related to a patient identified by the dashboard, and/or analysis results relevant for the patient identified by the dashboard. The patient dashboard may also include means to submit new analyses for a patient identified by the dashboard.

As described above, the cytological specimen review system 510 may receive previously obtained and processed image data, or it may receive cytological specimens (e.g., 412) on microscope slides 414, or it can collect images from other systems such as imaging flow cytometers and line scanners. For purposes of illustration, where the system 510 processes images of cytological specimens 412, the following embodiments are described. The following embodiments are shown for example, and are not intended to limit the scope of the claims. In particular, the following embodiments describe obtaining cytological image data from specimens mounted on slides. However, other techniques for imaging cytological specimens are known and may be equally employed. For example, the images of cytological specimens 412 may originate from a flow cytometer or a PDMS biochip. See, e.g., U.S. Pat. No. 7,796,256, ("Oil-Immersion Enhanced Imaging Flow Cytometer") and U.S. patent application Ser. No. 12/740,087 ("Hybrid Microfluidic SPR and Molecular Imaging Device"), the contents of which are fully incorporated by reference. A further exemplary process for collecting images employing a line scanning apparatus is disclosed in U.S. Patent Application Publication 2010/0238442 ("Serial-Line-Scan Encoded Multicolor Fluorescence Microscopy and Imaging Flow Cytology), the contents of which are fully incorporated by reference.

Figure 5A:
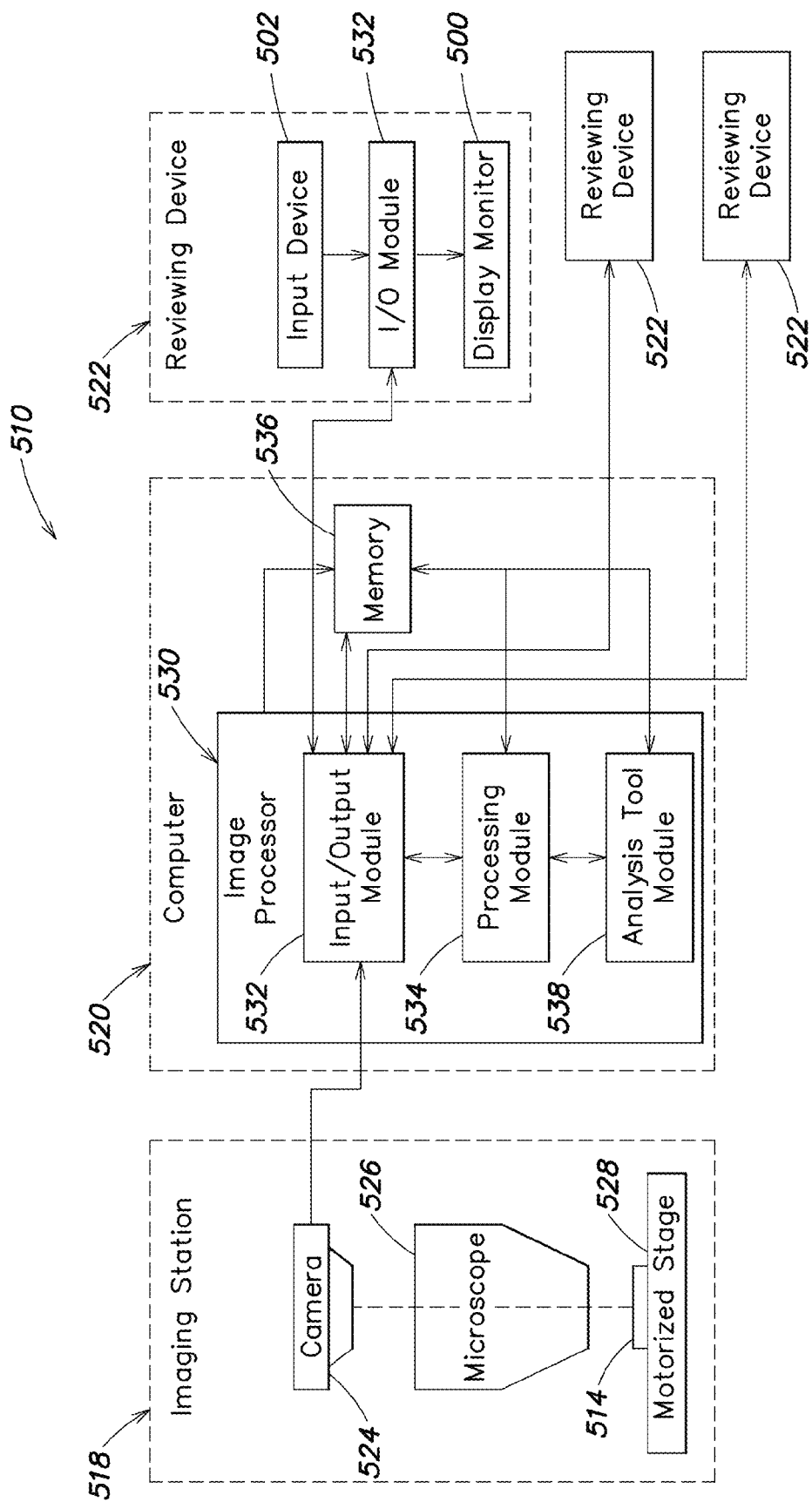
FIG. 5A is a schematic view of examples of image collection and cytological specimen review systems constructed in accordance with various embodiments of the disclosed inventions.

FIG. 5A depicts a cytological specimen review system 510 constructed in accordance with an embodiment of the present invention. The system 510 is configured for presenting a cytological specimen 412 located on a microscope slide 514 (best shown in FIG. 4 at 414) to a technician, such as a cytotechnologist, who can then review objects of interest (OOIs (e.g., 112)) located in the cytological specimen 412 as describe above. The slide 414 is provided with fiducial marks 416, the function of which will be described in further detail below.

Although the system 510 can be used to present any cytological specimen (or even a non-biological specimen, such as a computer chip) that requires further review, the system 510 lends itself particularly well to the presentation of cytological cervical or vaginal cellular material, such as that typically found on a Pap smear slide. In this case, the OOIs (e.g., 112) take the form of individual cells and cell clusters that are reviewed to check for the possible presence of an abnormal condition, such as malignancy or pre-malignancy. The cytological specimen 412 will typically be placed on the slide 414 as a thin cytological layer. Preferably, a cover slip (not shown) is adhered to the specimen 412, thereby fixing the specimen 412 in position on the slide 414. The specimen 412 may be stained with any suitable stain, such as a Papanicolaou stain. In other examples, specimens can be stained with advanced staining techniques. The system can store information on the type of stain, and in some examples, can provide images of a classified object with a plurality of stain types. In further embodiments, various specimens can be stained and imaged, de-stained, and re-stained for imaging with another stain. The system can link cellular objects so that a single object can be displayed with a variety of stains. Various user interface elements can enable a reviewer to select displays of an OOI and a particular stain. Further the user interface can be configured to display the OOI and respective images having respective stains (e.g., traditional stain, advanced stain, color staining, fluorescing stain, etc.).

The system 510 generally includes: (1) an imaging station 518 for obtaining images of the cytological material contained on the slide 514 and generating electronic image data from the images; (2) a computer 520 for filtering and processing the image data to identify OOIs (e.g., 112); and (3) a plurality of reviewing devices 522 (3 shown), each of which provides a display monitor 500 to present the OOIs (e.g., 112) for viewing by a cytotechnologist and an input device 502 to allow the cytotechnologist to interact with the system 510.

According to some embodiments, a review system can access digital images captured from, for example, line scanning apparatus. Digital images can also be captured by other systems, such as wide-field imaging devices with no moving x/y stages. The digital images can be captured and stored as part of a database of cytological images.

The imaging station 518 is configured to image the slide 514, which is typically contained within a cassette (not shown) along with other slides. During the imaging process, the slides are removed from the respective cassettes, imaged, and then returned to the cassettes in a serial fashion. In the illustrated embodiment, the imaging station 518 is capable of processing up to 10 cassettes, each holding up to 25 slides, in about 16 hours. Again, the foregoing described "slide imaging" embodiment is for purposes of illustration, and not limitation, and the cytological specimen images may be obtained by other known processes and apparatuses.

The imaging station 518 includes a camera 524, a microscope 526, and a motorized stage 528. The camera 524 captures magnified images of the slide 514 through the microscope 526. The camera 524 may be any one of a variety of conventional cameras, such as a charge coupled device (CCD) camera, which alone or in conjunction with other components, such as an analog-to-digital (A/D) converter, can produce a digital output of sufficient resolution to allow processing of the captured images, for example a digital image having a resolution of 640×480 pixels. Preferably, each pixel is converted into an eight-bit value (0 to 255) depending on its optical transmittance, with "00000000" being the assigned value for least amount of light passing through the pixel, and "11111111" being the assigned value for a greatest amount of light passing through the pixel.

The slide 514 is mounted on the motorized stage 528, which scans the slide 514 relative to the viewing region of the microscope 526, while the camera 254 captures images over various regions of the cytological specimen (e.g., 412). The shutter speed of the camera 524 is preferably relatively high, so that the scanning speed and/or number of images taken can be maximized. The motorized stage 528 keeps track of the x-y coordinates of the images as they are captured by the camera 524. For example, encoders (not shown) can be coupled to the respective motors of the motorized stage 528 in order to track the net distance traveled in the x- and y-directions during imaging. These coordinates are measured relative to the fiducial marks 416 affixed to the slide 414 (shown in FIG. 4).

In some embodiments, reviewer can switch between stored digital images of an OOI and views of the OOI as it appears on the specimen. In some examples, the system can use coordinate information to move a stage to a specified x-y coordinate for additional review of an OOI directly on a slide.

The computer 520 includes an image processor 530 that is configured to identify OOIs (e.g., 112) from the image data acquired from the camera 524 and a memory 536 configured for storing the image data and information relating to the OOIs (e.g., 112). The image processor 530 includes an input/output module 532, a processing module 534, and an analysis tool module 538. The input/output module 532 is configured to store image data, i.e., pixel data, acquired from the camera 524 in the memory 536, and to retrieve image data therefrom. The processing module 534 analyzes the image data to identify OOIs (e.g., 112), as will be described below. The processing module 534 also determines the likelihood that an OOI (e.g., 112) has a certain predetermined characteristic and generates a ranking based on the respective likelihoods of the OOIs (e.g., 112). The ranking and x-y coordinates of the OOIs (e.g., 112), as well as thumbnail images (e.g., 110) of each OOI (e.g., 112) are stored in memory 536. It should be appreciated that the functions performed by the respective processors and modules 530, 532, and 534 can be performed by a single processor or module, or alternatively, performed by more than three processors and modules. Likewise, it can be appreciated that the memory 536 can be divided into several memories.

The processing module 534 of the image processor 530 identifies the OOIs (e.g., 112) within the cytological specimen 412 by manipulating the digital images received from the camera 524 in a suitable manner. In one embodiment, the processing module 534 accomplishes this using primary and secondary segmentation operations.

In the primary segmentation operation, the processing module 534 removes artifacts from further consideration. The processing module 534 accomplishes this by masking pixels in the digital image data from further consideration that, by virtue of their lightness, are unlikely to be cell nuclei. The remaining pixels in the digital image form "blobs" having all manner of shapes and sizes. The processing module 534 then performs an erosion process on the blobs in order to remove from further consideration blobs that are only a few pixels in diameter and narrow strands extending from blobs or connecting adjacent blobs. The processing module 534 then determines whether each blob in the image is an individual object or a clustered object, depending on the number of pixels in the blob. For example, a blob having more than 500 pixels might be considered a clustered object, whereas a blob having 500 or less pixels might be considered an individual object. For individual objects, blobs that do not meet certain criteria related to total area, perimeter to area ratio, optical density standard deviation, and grayscale mean pixel value are not considered further.

In the secondary segmentation operation, the processing module 534 removes blobs that are unlikely to be individual cells or clustered cells. For individual objects, the processing module 534 performs a series of erosion operations, which remove small objects and eliminates projections from the remaining blobs, and dilation operations, which remove holes from the remaining blobs. For clustered objects, the processing module 534 sharpens the edges of the object to provide a defined border. From the defined clustered object, the processing module 534 then selects an individual object or objects having the highest integrated optical density. The individual objects extracted from clustered objects will be flagged as cluster-extracted objects.

In the OOI identification operation, the processing module 534 measures various features for each of the individual objects and clustered objects, and then calculates an object score for each object based on the measured values of these features. In further embodiments, the processing module can extract feature parameters for individual and clustered objects according to a type of stain. The processing module can analyze information on features obtained from respective stains and use the feature information to calculate object scores. Feature information can be associated with an object and stored for later access. Based on this score, the processing module 534 removes individual objects and clustered objects that are likely to be artifacts. Those remaining are considered OOIs (e.g., 112), with the individual objects representing individual OOIs (e.g., 112) ("IOOIs"), and the clustered objects representing clustered ("COOIs"). The processing module 534 then evaluates the OOIs (e.g., 112) for their nuclear integrated or average optical density, and ranks the OOIs (e.g., 112) in accordance with their optical density values. While integrated or average optical density is the evaluated characteristic in this embodiment, other object characteristics, or combinations of object characteristics are also encompassed by the claim. In some embodiments, the processing module can evaluate OOIs based on any one or more of: morphological characteristics, stains (e.g., chromogenic, fluorescent, dual, etc.), cell size, nucleus/cytoplasm ratio, optical density, regularity of contour, color based criteria, and nucleic density. For each digital image, the input/output module 532 stores thumbnail images (e.g., 110) of the OOIs (e.g., 112), along with their relative ranking, coordinates, and extracted features.

In the embodiment depicted in FIG. 5A, three reviewing stations 522 are shown coupled to the computer 520, so that up to three cytotechnologists have simultaneous access to the pertinent information stored in the computer 520. Additional near-by or remote reviewing stations or monitoring devices can also have access to the pertinent information stored in the computer 520. Notably, the system 510 can typically process the slides 514 much quicker than a cytotechnologist can review them. Even if the specimen processing speed of the system 510 is slower than the specimen review speed of a cytotechnologist, the system 510 can generally be operated 24 hours a day, whereas the typical cytotechnologist will only work 8 hours a day. Thus, the bottleneck in the screening process occurs at the human level, i.e., the detailed review of the cytological material contained on the slides 514. Thus, it can be appreciated that the use of multiple reviewing devices 522 alleviates this bottleneck, thereby providing for a much more efficient process. However, the claims encompass cytological specimen review systems 510 including only a single review device 522. The number of reviewing devices 522 connected to the computer 520 can be modified to suit the task at hand.

Suitable reviewing devices 522 include tablet computers, smart phones, augmented reality head-mounted displays, personal computers, networked workstations, and other computer input/output devices known in the art, all connected to the computer 520. The connection may be hardwired or wireless. The review devices 522 of a particular cytological specimen review system 510 may be identical to or different from each other. The reviewing devices 522 also include input devices 502 such as keyboards, computer mice, touchscreens, and voice recognition hardware. Each reviewing device 522 includes a display monitor 500 to facilitate cytotechnologist interaction with the system 510. Each reviewing device 522 also includes an input/output module 532 operatively connected to the input/output module 532 of the computer 520.

While the computer 520 and reviewing devices 522 are depicted as separate devices in FIG. 5A, it should be appreciated that individual computers 520, including all the modules and memory described above, may reside in each reviewing device 522. Such a system architecture would eliminate the need for a standalone computer 520 connected to the imaging station 518. Accordingly, in some embodiments each reviewing device 522 can be directly connected to the imaging station 518.

Figure 5B:
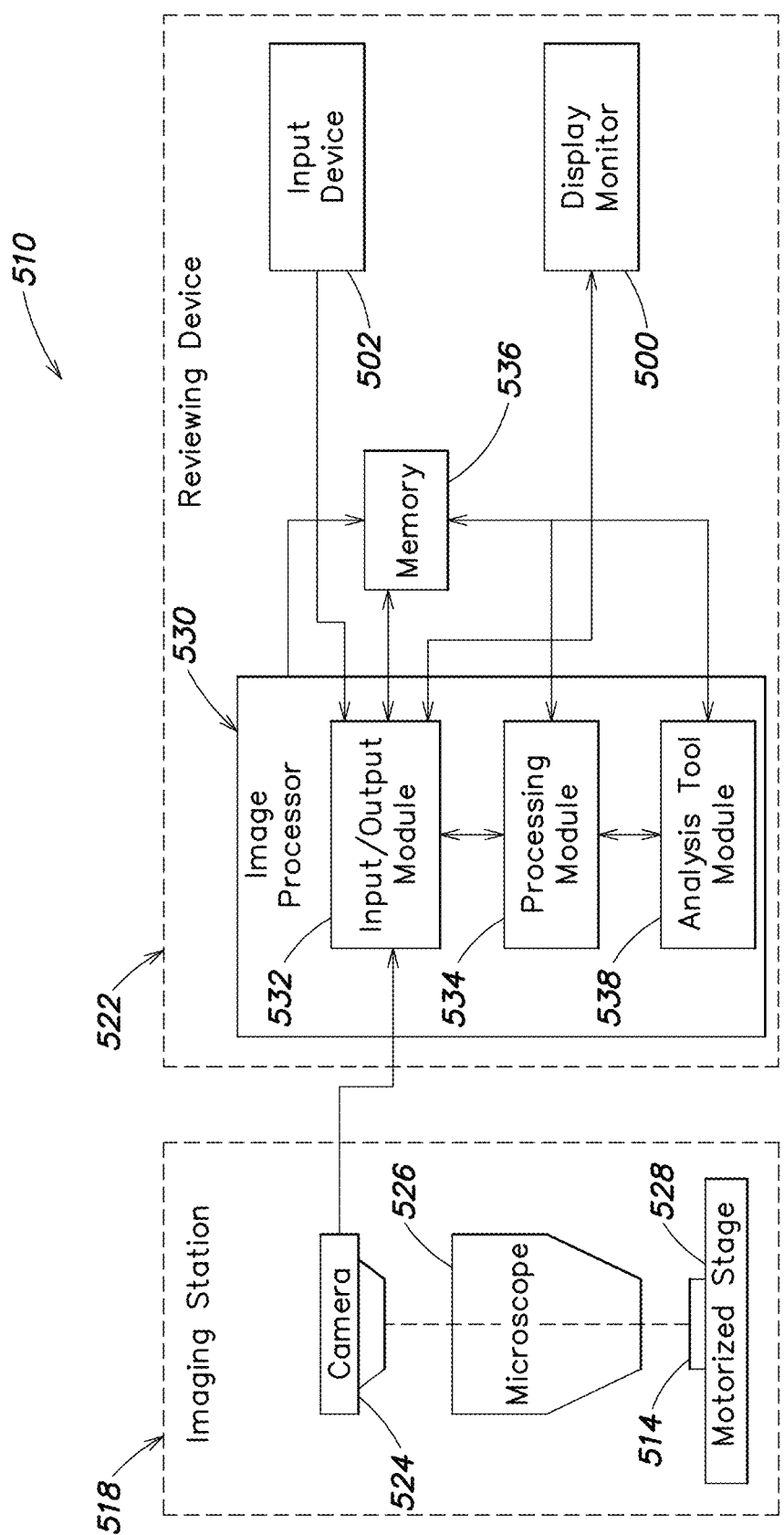
FIG. 5B is another schematic view of examples of image collection and cytological specimen review systems constructed in accordance with various embodiments of the disclosed inventions.

For instance, the embodiment depicted in FIG. 5B includes only an imaging station 518 and a review device 522. The review device 522 includes an image processor 530, a memory 536, a display monitor 500, and an input device 502. The image processor 530 includes an input/output module 532, a processing module 534, and an analysis tool module 538. These modules are interconnected. The input/output module 532 of the review device 522 is directly connected to the imaging station 518. The other elements of the review device 522 perform the same functions as the corresponding elements in the embodiment depicted in FIG. 5A. In further embodiments, the reviewing device may operate independently from the imaging stations and/or computer system. For example, the reviewing device can be used to download specimen images for review. In further examples, any information developed on the reviewing device can be uploaded to a central repository of specimen data.

The concepts of the disclosed inventions can be applied to other cytology related applications. For instance, the review and analysis system (especially the analysis tools) can be applied to cytotechnologist training. "Proficiency Testing" can be a separate mode of operation. The "Proficiency Testing" mode is similar to a regular digital image OOI review with the additional functionality of cytotechnologist proficiency testing, i.e., the cytotechnologist would be scored on correct/wrong classifications. Different levels of proficiency could be tested by using different difficulty levels of cell classification (i.e., a clear-cut pre-classified example of abnormality versus a pre-classified but complicated or ambiguous example for the more advanced students).

The review and analysis system (especially the analysis tools) can be used to facilitate dialogue about selected OOIs. As part of a training module, annotated instructional comments can be tied to OOIs. For example, in a training gallery of OOIs, the image of an ASCUS (atypical cells of undetermined significance) OOI can be double-clicked to cause a training explanation to be displayed. The explanation can contain the relevant features and metrics used to classify it as ASCUS and can be displayed as text or highlighted in the image or illustrated with metrics previously extracted. As part of a remotely monitored training module, an "I need help with this one" module can be constructed using selected thumbnails of specific OOIs. By digitally marking specific OOI's identified by a student for a teacher's remote review and comments, a dialogue can be facilitated over classification techniques and important features used for classification.

Similarly, expert trainers can compile their own personal libraries, and add comments such as "I think these images are great examples of ASCUS OOIs." By using some of the disclosed analysis tools, cytotechnologist instructors can develop their own libraries for teaching purposes. The review and analysis system can also be used in an "I Think the Algorithm Needs Help" mode. In order to improve existing algorithms, the system can facilitate highlighting user-identified abnormal OOIs that the algorithm missed. A highlighting, storage and transmission mechanism, along with annotated comments, would facilitate exchange of information between users and algorithm developers for future modifications and improvements.

The review and analysis system (especially the analysis tools) can be used to adjudicate clinical trials. In many clinical trials (or even in routine second opinion reviews or re-reads) a process of adjudication is often used. For example, in clinical trials there can be three pathologists that simultaneously review and classify a set of patient samples. With the analysis tools described herein, each reviewer can create his/her own gallery of classified OOIs, with comments if necessary. The resulting galleries of OOIs can be compared and adjudicated manually or automatically. Similarly, for second opinion reviews, a process of comparing and adjudicating final diagnoses of selected OOIs can be facilitated by the disclosed analysis tools.

In further embodiments, users can access help features on the system for diagnostics purposes. The user can access "help me quantify" functions on the system. Responsive to user selection, the system can return information on how many OOIs are similar to a currently viewed OOI to facilitate classification/diagnosis. Further, the user interface can highlight the similar OOIs that have already been classified and/or used as part of a diagnosis.

The review and analysis system can also be used to provide interactive grading of OOIs. In some embodiments, reviewers (e.g., cytotechnologists, pathologists, etc.) can designate a diagnostic category for OOIs that are displayed. Any input information can be associated with an OOI and stored for later use. For example, subsequent reviewers can access information entered by prior reviewers. Classifications, notes, and/or comments can be associated with specific OOIs, and/or specimens as whole. Subsequent reviewers gain the benefit of contextually presented notes, comments, and/or classifications. According to another embodiment, digitally marking OOIs or specimens enhances the ability to capture data (e.g., over conventional approaches of ink marks on slides). In further embodiments, reviewer classifications of OOIs can be used to augment system based identification of OOIs. In one example, the system can implement learning algorithms to identify OOIs. Reviewer data can be used as training data to refine algorithmic analysis of OOIs.

In further embodiments, users can annotate OOIs, specimens, etc., during review. The user can then access the information that they have annotated to facilitate further review. For example, users can access other OOIs that they have reviewed and/or graded for display against a current OOI. In further examples, users can import OOIs reviewed, annotated, and/or graded in other specimens to provide reference(s) for a current specimen review and/or review of a current OOI. According to one embodiment, users can access prior review information in a "more like this" mode (e.g., FIG. 2).

According to some embodiments, the system generates automatic identification of OOI that are likely to include morphological features. The information generated during feature identification can be stored for later use by the system (e.g., in determining similar objects, etc.). In some examples, information on OOIs can be stored and associated into one or more data records. The data records can be organized into a smart database such that any information related to an object of interest can be accessed. In some embodiments, the specimen can be taken from a patient, undergoing a variety of testing procedures. Image based information (e.g., cytology analysis) can be combined with other testing information, such that a specimen and/or OOIs within the specimen include information on other testing (e.g., positive DNA test on patient sample). For example, the database can store and index testing information on a patient over time to provide historical information.

According to some embodiments, the database can include a variety of records for storing data on OOIs. In some examples, the data records include at least specimen information, position information, and feature information for the OOI. In other examples, the data records can also include calculated object scores and/or user entered information (e.g., classification tags, notes, comments, etc.). In further examples, the data record can reflect patient information, an/or include information on respective patient testing. In some examples, the data records include links for accessing patient testing information.

In further embodiments, the database can include calculated information. In one example, the system can calculate distributions of feature characteristics with a specimen, multiple specimens, etc. The calculated information can be incorporated into user interface displays. For example, the user interface can display histograms of feature distributions based on a specimen, multiple specimens, etc. The system can use distribution information to determine if particular feature(s) provide any distinguishing information. Additionally, the database can track information on the reviewers. The system can analyze reviewer history and compare reviewers based on the information stored in the database. Such historical information can be used as feedback for classification algorithms.

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 6:
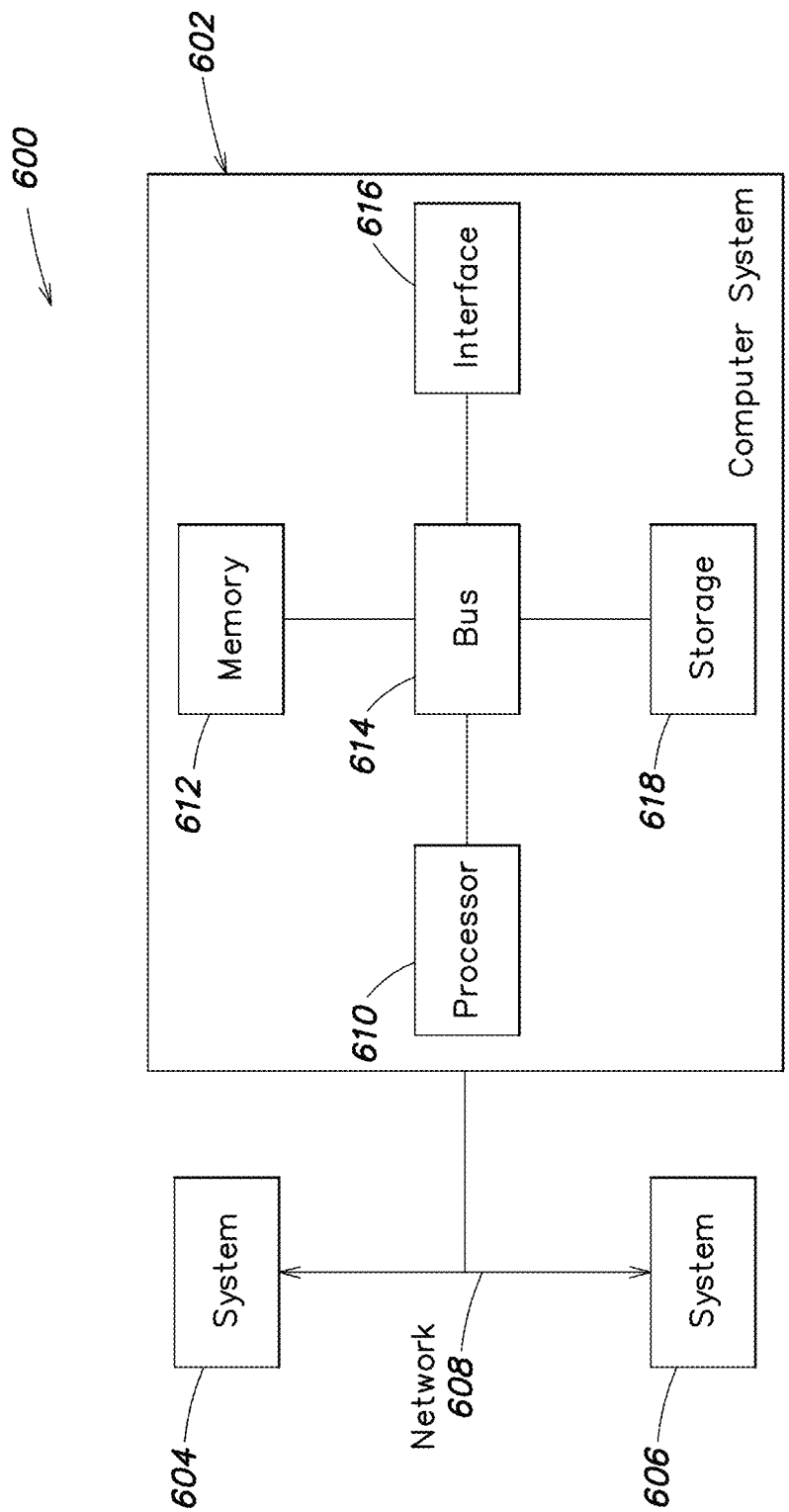
FIG. 6 is a schematic diagram of one example of a computer system that can perform processes and functions disclosed herein.

Referring to FIG. 6, there is illustrated a block diagram of a distributed computer system 600, in which various aspects and functions are practiced. As shown, the distributed computer system 600 includes one or more computer systems that exchange information. More specifically, the distributed computer system 600 includes computer systems 602, 604 and 606. As shown, the computer systems 602, 604 and 606 are interconnected by, and may exchange data through, a communication network 608. The network 608 may include any communication network through which computer systems may exchange data. To exchange data using the network 608, the computer systems 602, 604 and 606 and the network 608 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 602, 604 and 606 may transmit data via the network 608 using a variety of security measures including, for example, TLS, SSL or VPN. While the distributed computer system 600 illustrates three networked computer systems, the distributed computer system 600 is not so limited and may include any number of computer systems and computing devices, networked using any medium and communication protocol.

As illustrated in FIG. 6, the computer system 602 includes a processor 610, a memory 612, a bus 614, an interface 616 and data storage 618. To implement at least some of the aspects, functions and processes disclosed herein, the processor 610 performs a series of instructions that result in manipulated data. The processor 610 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 610 is connected to other system components, including one or more memory devices 612, by the bus 614.

The memory 612 stores programs and data during operation of the computer system 602. Thus, the memory 612 may be a relatively high performance, volatile, random access memory such as a dynamic random access memory (DRAM) or static memory (SRAM). However, the memory 612 may include any device for storing data, such as a disk drive or other non-volatile storage device. Various examples may organize the memory 612 into particularized and, in some cases, unique structures to perform the functions disclosed herein. These data structures may be sized and organized to store values for particular data and types of data.

Components of the computer system 602 are coupled by an interconnection element such as the bus 614. The bus 614 may include one or more physical busses, for example, busses between components that are integrated within a same machine, but may include any communication coupling between system elements including specialized or standard computing bus technologies such as IDE, SCSI, PCI and InfiniBand. The bus 614 enables communications, such as data and instructions, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 602 to exchange information and to communicate with external entities, such as users and other systems.

The data storage 618 includes a computer readable and writeable nonvolatile, or non-transitory, data storage medium in which instructions are stored that define a program or other object that is executed by the processor 610. The data storage 618 also may include information that is recorded, on or in, the medium, and that is processed by the processor 610 during execution of the program. More specifically, the information may be stored in one or more data structures specifically configured to conserve storage space or increase data exchange performance. The instructions may be persistently stored as encoded signals, and the instructions may cause the processor 610 to perform any of the functions described herein. The medium may, for example, be optical disk, magnetic disk or flash memory, among others. In operation, the processor 610 or some other controller causes data to be read from the nonvolatile recording medium into another memory, such as the memory 612, that allows for faster access to the information by the processor 610 than does the storage medium included in the data storage 618. The memory may be located in the data storage 618 or in the memory 612, however, the processor 610 manipulates the data within the memory, and then copies the data to the storage medium associated with the data storage 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 6. Various aspects and functions may be practiced on one or more computers having a different architectures or components than that shown in FIG. 6. For instance, the computer system 602 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 602 may be a computer system including an operating system that manages at least a portion of the hardware elements included in the computer system 602. In some examples, a processor or controller, such as the processor 610, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 610 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Although particular embodiments of the disclosed inventions have been shown and described herein, it will be understood by those skilled in the art that they are not intended to limit the present inventions, and it will be obvious to those skilled in the art that various changes and modifications may be made (e.g., the dimensions of various parts) without departing from the scope of the disclosed inventions, which is to be defined only by the following claims and their equivalents. The specification and drawings are, accordingly, to be regarded in an illustrative rather than restrictive sense. The various embodiments of the disclosed inventions shown and described herein are intended to cover alternatives, modifications, and equivalents of the disclosed inventions, which may be included within the scope of the appended claims.

What is claimed is:

1. A computer-assisted method of navigating images of a cytological specimen, comprising the acts of:
   analyzing a first image of the cytological specimen to identify an object of interest within the cytological specimen;
   displaying a second image of the object of interest to a user; and
   in response to receiving a user selection of the object of interest:
      determining a first characteristic of the selected object of interest;
      receiving, from the user, a range of values corresponding to a second characteristic of the selected object of interest;
      evaluating one or more objects of interest to determine at least one other object of interest having a similar characteristic to the first characteristic of the selected object of interest and having a second characteristic measurement within the range of values; and
      displaying, responsive to determining the at least one other object of interest, a third image of the selected object of interest and a fourth image of the at least one other object of interest so as to provide for comparison of the objects of interest by the user.

2. The method of claim 1, wherein the fourth image of the at least one other object of interest is provided from the cytological specimen.

3. The method of claim 1, wherein the fourth image of the at least one other object of interest is provided from a database of previously stored objects of interest.

4. The method of claim 1, further comprising acts of:
   receiving, from the user, a classification of the selected object of interest; and
   storing the classification of the selected object of interest with the third image of the selected object of interest.

5. The method of claim 1, wherein the first characteristic and the second characteristic include any one of a cell size, a nucleus/cytoplasm ratio, a morphological characteristic, a stain, a color-based criteria, a nucleic density, an optical density, and a regularity of contour.

6. The method of claim 1, further including an act of assigning an object score to the at least one other object of interest.

7. A computer-assisted method of navigating images of a cytological specimen, comprising the acts of:
   analyzing a first image of the cytological specimen to identify one or more objects of interest within the cytological specimen;
   displaying one or more images each comprising one of the one or more objects of interest within the cytological specimen and including a second image of at least one object of interest;
   in response to receiving a first user selection of the at least one object of interest:
      displaying a field of view of the at least one object of interest and neighboring objects of interest,
         wherein the second image of the at least one object of interest has a first magnification, and wherein the field of view of the at least one object of interest is displayed at a second magnification different than the first magnification;

in response to receiving a second user selection of the at least one object of interest:
determining a first characteristic of the selected object of interest;
receiving, from the user, a range of values corresponding to a second characteristic of the selected object of interest;
evaluating at least one object of interest to determine at least one other object of interest having a similar characteristic to the first characteristic of the selected object of interest and having a second characteristic measurement within the range of values; and
displaying, responsive to determining the at least one other object of interest, a third image of the selected object of interest and a fourth image of the at least one other object of interest so as to provide for comparison of the objects of interest by the user.

8. The method of claim 7, wherein the second image of the at least one object of interest is displayed in a scroll bar.

9. The method of claim 7, further comprising acts of:
receiving, from a user, a classification of the at least one object of interest; and
storing the classification of the at least one object of interest with the second image of the at least one object of interest.

10. The method of claim 7, wherein the field of view is accessed from a database of cytological specimen images.

11. A system for navigating images of a cytological specimen, the system comprising:
at least one processor operatively connected to a memory;
a user interface display; and
a user interface component, executed by the at least one processor, configured to:
analyze a first image of the cytological specimen to identify an object of interest within the cytological specimen;
display a second image of the object of interest;
receive a user selection of the object of interest;
determine a first characteristic of the selected object of interest;
receive, from a user, a range of values corresponding to a second characteristic;
evaluate one or more objects of interest to determine at least one other object of interest having a similar characteristic to the first characteristic of the selected object of interest and having a second characteristic measurement within the range of values corresponding to the second characteristic; and
display, responsive to determining the at least one other object of interest, a third image of the object of interest and a fourth image of the at least one other object of interest.

12. The system of claim 11, wherein the fourth image of the at least one other object of interest is provided from the cytological specimen.

13. The system of claim 11, wherein the fourth image of the at least one other object of interest is provided from a database of previously-stored objects of interest.

14. The system of claim 11, wherein the user interface component is further configured to:

receive a classification of the object of interest; and
store the classification of the object of interest with the second image of the object of interest.

15. The system of claim 11, wherein the first characteristic and the second characteristic include any one of a cell size, a nucleus/cytoplasm ratio, a morphological characteristic, a stain, a color-based criteria, a nucleic density, an optical density, and a regularity of contour.

16. The system of claim 11, wherein the user interface component is further configured to assign an object score to the at least one other object of interest.

17. A system for inspecting images of a cytological specimen, the system comprising:
at least one processor operatively coupled to a memory;
a user interface display; and
a user interface component, executed by the at least one processor, configured to:
analyze a first image of the cytological specimen to identify a plurality of objects of interest within the cytological specimen;
display a plurality of images each comprising one of the plurality of identified objects of interest within the cytological specimen and including a second image of at least one object of interest;
responsive to receiving a first user selection of the second image of the at least one object of interest:
display a field of view of the at least one object of interest and neighboring objects of interest,
wherein the second image of the at least one object of interest has a first magnification, and
wherein the field of view of the at least one object of interest has a second magnification different than the first magnification; and
responsive to receiving a second user selection of the second image of the at least one object of interest:
determine a first characteristic of the at least one object of interest;
receive, from a user, a range of values corresponding to a second characteristic;
evaluate one or more objects of interest to determine at least one other object of interest having a similar characteristic of the selected object of interest and having a second characteristic measurement within the range of values corresponding to the second characteristic; and
display, responsive to determining the at least one other object of interest, a third image of the object of interest and a fourth image of the at least one other object of interest.

18. The system of claim 17, wherein the second image of at least one object of interest is displayed in a scroll bar.

19. The system of claim 17, wherein the user interface component is further configured to:
receive a classification of the at least one object of interest; and
store the classification of the at least one object of interest with the second image of the at least one object of interest.

20. The system of claim 17, wherein the field of view can be accessed from a database of cytological specimen images.

* * * * *